(12) United States Patent
Cho

(10) Patent No.: US 12,493,431 B2
(45) Date of Patent: Dec. 9, 2025

(54) STORAGE DEVICE AND STORAGE SYSTEM FOR DIRECT STORAGE

(71) Applicant: Samsung Electronics Co., Ltd., Suwon-si (KR)

(72) Inventor: Beomsig Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 18/217,003

(22) Filed: Jun. 30, 2023

(65) Prior Publication Data

US 2024/0176540 A1    May 30, 2024

(30) Foreign Application Priority Data

Nov. 29, 2022 (KR) .................. 10-2022-0162757

(51) Int. Cl.
*G06F 3/00* (2006.01)
*G06F 3/06* (2006.01)
*G06F 12/00* (2006.01)

(52) U.S. Cl.
CPC .......... *G06F 3/0659* (2013.01); *G06F 3/0607* (2013.01); *G06F 3/0679* (2013.01)

(58) Field of Classification Search
CPC ..... G06F 3/0659; G06F 3/0607; G06F 3/0679
USPC ....................................................... 711/154
See application file for complete search history.

(56) References Cited

U.S. PATENT DOCUMENTS

| | | | |
|---|---|---|---|
| 4,458,316 A * | 7/1984 | Fry | G06F 12/123 710/52 |
| 4,467,411 A * | 8/1984 | Fry | G06F 3/0686 711/E12.072 |
| 7,571,273 B2 | 8/2009 | Boyd et al. | |
| 8,127,113 B1 * | 2/2012 | Sinha | G06F 9/54 712/34 |
| 9,405,550 B2 * | 8/2016 | Biran | G06F 9/3877 |
| 10,671,302 B1 * | 6/2020 | Aggarwal | G06F 3/067 |
| 10,713,202 B2 * | 7/2020 | Park | G06F 13/4282 |
| 10,917,471 B1 * | 2/2021 | Karumbunathan | G06F 3/064 |
| 10,924,548 B1 * | 2/2021 | Karumbunathan | H04L 61/4552 |

(Continued)

FOREIGN PATENT DOCUMENTS

KR    10-2365312 B1    2/2022

OTHER PUBLICATIONS

2025.*
European Extended Search Report issued Apr. 8, 2024 by the European Patent Office for EP Patent Application No. 23188179.8.
Communication dated Feb. 11, 2025, issued by the European Patent Office in European Application No. 23188179.8.

*Primary Examiner* — Sheng Jen Tsai
(74) *Attorney, Agent, or Firm* — Sughrue Mion, PLLC

(57) ABSTRACT

A storage device includes one or more ports that form an electrical connection with an external device, one or more physical functions including physical resources, and exposed through the one or more ports to communicate with the external device, a storage controller that controls an operation of the storage device, and communicates with the external device through the one or more ports and the one or more physical functions, nonvolatile memories controlled by the storage controller, and a first buffer memory controlled by the storage controller. When the storage device is accessed by the external device, the first buffer memory is used by the one or more ports and the one or more physical functions to temporarily store data for the external device.

20 Claims, 37 Drawing Sheets

(56) References Cited

U.S. PATENT DOCUMENTS

| | | | |
|---|---|---|---|
| 11,010,198 B2* | 5/2021 | Burger | G06F 9/5077 |
| 11,032,259 B1* | 6/2021 | Bernat | H04L 63/0428 |
| 11,036,677 B1* | 6/2021 | Grunwald | G06F 21/78 |
| 11,093,139 B1* | 8/2021 | Karr | G06F 3/0652 |
| 11,169,727 B1* | 11/2021 | Doucette | G06F 3/067 |
| 11,182,314 B1* | 11/2021 | Borkovic | G06N 3/063 |
| 11,210,009 B1* | 12/2021 | Freilich | G06F 11/2071 |
| 11,218,396 B2 | 1/2022 | Prohofsky | |
| 11,288,138 B1* | 3/2022 | Freilich | G06F 11/2094 |
| 11,360,689 B1* | 6/2022 | Grunwald | G06F 11/1484 |
| 11,403,000 B1* | 8/2022 | Barker, Jr. | G06F 3/0664 |
| 11,416,298 B1* | 8/2022 | Barker, Jr. | G06F 3/061 |
| 11,429,544 B2* | 8/2022 | Steinmetz | G06F 11/0751 |
| 11,467,776 B1* | 10/2022 | Chang | G06F 3/061 |
| 11,487,715 B1* | 11/2022 | Karr | G06F 3/067 |
| 11,494,321 B1* | 11/2022 | Yu | G06F 9/30043 |
| 11,494,692 B1* | 11/2022 | Watkins | H04L 67/1089 |
| 11,593,294 B2* | 2/2023 | Galles | G06F 13/4022 |
| 11,625,269 B1* | 4/2023 | Geva | G06F 8/43 712/220 |
| 11,645,011 B2 | 5/2023 | Lee et al. | |
| 11,789,859 B1* | 10/2023 | Xu | G06F 12/0207 711/154 |
| 11,797,183 B1* | 10/2023 | Agarwal | G06F 3/061 |
| 11,868,895 B2* | 1/2024 | Huang | G06N 3/063 |
| 11,875,247 B1* | 1/2024 | Heaton | G06N 3/063 |
| 2001/0052038 A1* | 12/2001 | Fallon | G06F 3/0658 710/22 |
| 2004/0057429 A1* | 3/2004 | Marklund | H04L 61/00 370/389 |
| 2004/0103261 A1* | 5/2004 | Honda | G06F 3/0665 711/202 |
| 2004/0156393 A1* | 8/2004 | Gupta | H04L 9/40 370/469 |
| 2008/0137677 A1* | 6/2008 | Boyd | G06F 13/385 370/419 |
| 2008/0228973 A1* | 9/2008 | Lee | G11C 7/1075 710/105 |
| 2009/0282194 A1* | 11/2009 | Nagashima | G06F 13/385 711/E12.083 |
| 2010/0027049 A1* | 2/2010 | Seignol | H04N 1/00127 358/1.15 |
| 2010/0058031 A1* | 3/2010 | Aho | G06F 9/5027 712/42 |
| 2011/0035494 A1* | 2/2011 | Pandey | G06F 9/5077 709/224 |
| 2014/0012981 A1* | 1/2014 | Samuell | H04L 47/40 709/224 |
| 2014/0222958 A1* | 8/2014 | Bostick | G06F 3/067 709/217 |
| 2015/0149695 A1* | 5/2015 | Khan | G06F 3/0608 |
| 2016/0188222 A1* | 6/2016 | Miller | G06F 3/067 711/125 |
| 2017/0012850 A1* | 1/2017 | Kumbhari | H04L 43/106 |
| 2017/0200094 A1* | 7/2017 | Bruestle | G06F 7/023 |
| 2017/0293580 A1* | 10/2017 | Hsieh | G06F 13/385 |
| 2017/0351471 A1* | 12/2017 | Passeri | G06F 3/033 |
| 2018/0205652 A1* | 7/2018 | Saxena | H04L 61/2557 |
| 2018/0341611 A1* | 11/2018 | Whittington | H04L 12/462 |
| 2018/0357005 A1* | 12/2018 | Lee | G06F 18/22 |
| 2019/0311123 A1* | 10/2019 | Lal | H04L 9/0637 |
| 2019/0324969 A1* | 10/2019 | Fujimoto | G06F 3/067 |
| 2019/0377513 A1* | 12/2019 | Park | G06F 3/061 |
| 2020/0012482 A1* | 1/2020 | Tørudbakken | G06F 8/458 |
| 2020/0012534 A1* | 1/2020 | Tørudbakken | G06F 3/0658 |
| 2020/0012609 A1* | 1/2020 | Tørudbakken | G06F 12/0868 |
| 2020/0014560 A1* | 1/2020 | Tørudbakken | G06F 12/0835 |
| 2020/0014631 A1* | 1/2020 | Tørudbakken | G06F 15/17331 |
| 2020/0050385 A1* | 2/2020 | Furey | G06F 3/0653 |
| 2020/0050401 A1* | 2/2020 | Gibb | G06F 3/0607 |
| 2020/0145419 A1* | 5/2020 | Yitbarek | H04L 63/0853 |
| 2020/0151104 A1* | 5/2020 | Yang | G06F 13/4282 |
| 2020/0174671 A1* | 6/2020 | Margaglia | G06F 11/2071 |
| 2020/0174828 A1* | 6/2020 | Manula | G06F 9/3877 |
| 2020/0174851 A1* | 6/2020 | Manula | H04L 67/55 |
| 2020/0192848 A1* | 6/2020 | Maroney | G06F 12/0284 |
| 2020/0310694 A1* | 10/2020 | Gao | G06F 3/067 |
| 2020/0387330 A1* | 12/2020 | Cassia | G06F 3/0656 |
| 2020/0401751 A1 | 12/2020 | Kachare et al. | |
| 2020/0409664 A1* | 12/2020 | Li | G06F 8/4441 |
| 2021/0006614 A1* | 1/2021 | Oyman | H04N 19/30 |
| 2021/0019063 A1* | 1/2021 | Lee | G06F 11/1484 |
| 2021/0019070 A1* | 1/2021 | Karr | G06F 3/0688 |
| 2021/0019093 A1* | 1/2021 | Karr | G06F 3/0608 |
| 2021/0019237 A1* | 1/2021 | Karr | G06F 3/0647 |
| 2021/0055885 A1* | 2/2021 | Strathman | G06F 3/0604 |
| 2021/0081432 A1* | 3/2021 | Grunwald | G06F 11/1471 |
| 2021/0124626 A1* | 4/2021 | Manula | G06F 9/52 |
| 2021/0173791 A1* | 6/2021 | Kim | G06F 12/0246 |
| 2021/0194793 A1* | 6/2021 | Huse | G06F 9/3889 |
| 2021/0200602 A1* | 7/2021 | Manula | G06F 9/522 |
| 2021/0232331 A1* | 7/2021 | Kannan | G06N 20/00 |
| 2021/0255971 A1* | 8/2021 | Kim | G06F 3/0659 |
| 2021/0318805 A1* | 10/2021 | Dongaonkar | G06F 3/0604 |
| 2021/0326683 A1* | 10/2021 | Narayanaswami | G06N 3/045 |
| 2021/0400286 A1* | 12/2021 | Kale | G06F 13/4282 |
| 2022/0019385 A1* | 1/2022 | Karr | G06F 11/1092 |
| 2022/0021515 A1* | 1/2022 | Jang | G06F 21/6209 |
| 2022/0043695 A1* | 2/2022 | Gallegos | G06F 3/0605 |
| 2022/0083245 A1* | 3/2022 | Kant | G06F 3/0688 |
| 2022/0100669 A1* | 3/2022 | Choe | G06F 12/0877 |
| 2022/0103629 A1* | 3/2022 | Cherian | G06F 3/0604 |
| 2022/0129181 A1* | 4/2022 | Morabad | G06F 3/0604 |
| 2022/0156287 A1* | 5/2022 | Zhang | G06F 3/0659 |
| 2022/0179463 A1 | 6/2022 | Keeth | |
| 2022/0188033 A1* | 6/2022 | Cho | G06F 3/0679 |
| 2022/0197556 A1* | 6/2022 | Bert | G06F 3/0604 |
| 2022/0206962 A1* | 6/2022 | Kim | G06F 13/102 |
| 2022/0206964 A1* | 6/2022 | Kim | G06F 13/1668 |
| 2022/0224776 A1* | 7/2022 | Doshi | G06F 12/0897 |
| 2022/0232075 A1* | 7/2022 | Emerson | H04L 67/1097 |
| 2022/0308879 A1* | 9/2022 | Rusitoru | G06F 9/30145 |
| 2022/0334972 A1* | 10/2022 | Vijayrao | G06F 12/0284 |
| 2022/0358208 A1* | 11/2022 | Vijayrao | G06F 3/0637 |
| 2022/0405015 A1* | 12/2022 | Lee | G06F 3/0656 |
| 2023/0051825 A1* | 2/2023 | Chang | G06F 3/0688 |
| 2023/0102226 A1* | 3/2023 | Kim | G06N 3/063 711/154 |
| 2023/0135699 A1* | 5/2023 | Liao | H04W 4/50 370/252 |
| 2023/0143267 A1* | 5/2023 | Shin | G06F 12/0238 |
| 2023/0176735 A1* | 6/2023 | Li | G06F 3/061 711/154 |
| 2023/0205300 A1* | 6/2023 | Cooper | G06F 1/28 713/310 |
| 2023/0224953 A1* | 7/2023 | Xiong | H04L 1/0003 370/329 |
| 2023/0325117 A1* | 10/2023 | Muthiah | G06F 3/0607 |
| 2023/0350824 A1* | 11/2023 | Kim | G06F 13/28 |
| 2024/0004579 A1* | 1/2024 | Ji | G06F 3/0659 |
| 2024/0004762 A1* | 1/2024 | Lee | G06F 11/1469 |
| 2024/0037104 A1* | 2/2024 | Zhou | G06F 16/24569 |
| 2024/0154761 A1* | 5/2024 | Xiong | H04L 1/0009 |
| 2024/0176540 A1* | 5/2024 | Cho | G06F 3/0656 |
| 2024/0196178 A1* | 6/2024 | Ying | H04W 8/18 |
| 2024/0205738 A1* | 6/2024 | Shilov | H04W 4/70 |
| 2024/0276290 A1* | 8/2024 | Bangolae | G06F 9/4843 |
| 2024/0323711 A1* | 9/2024 | Li | H04B 17/17 |
| 2024/0333623 A1* | 10/2024 | Chou | H04L 12/1407 |
| 2024/0334382 A1* | 10/2024 | Yao | H04L 43/067 |

* cited by examiner

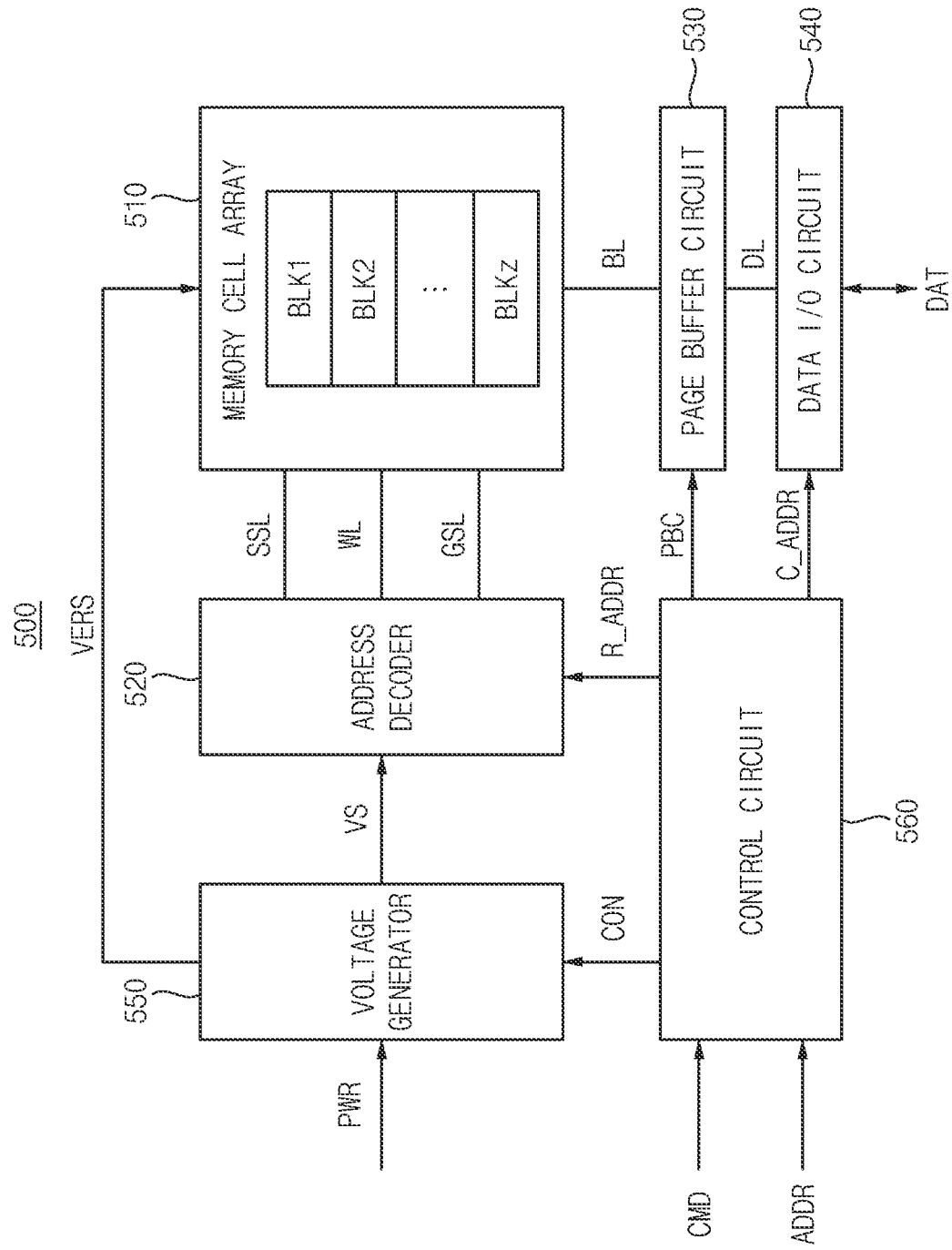

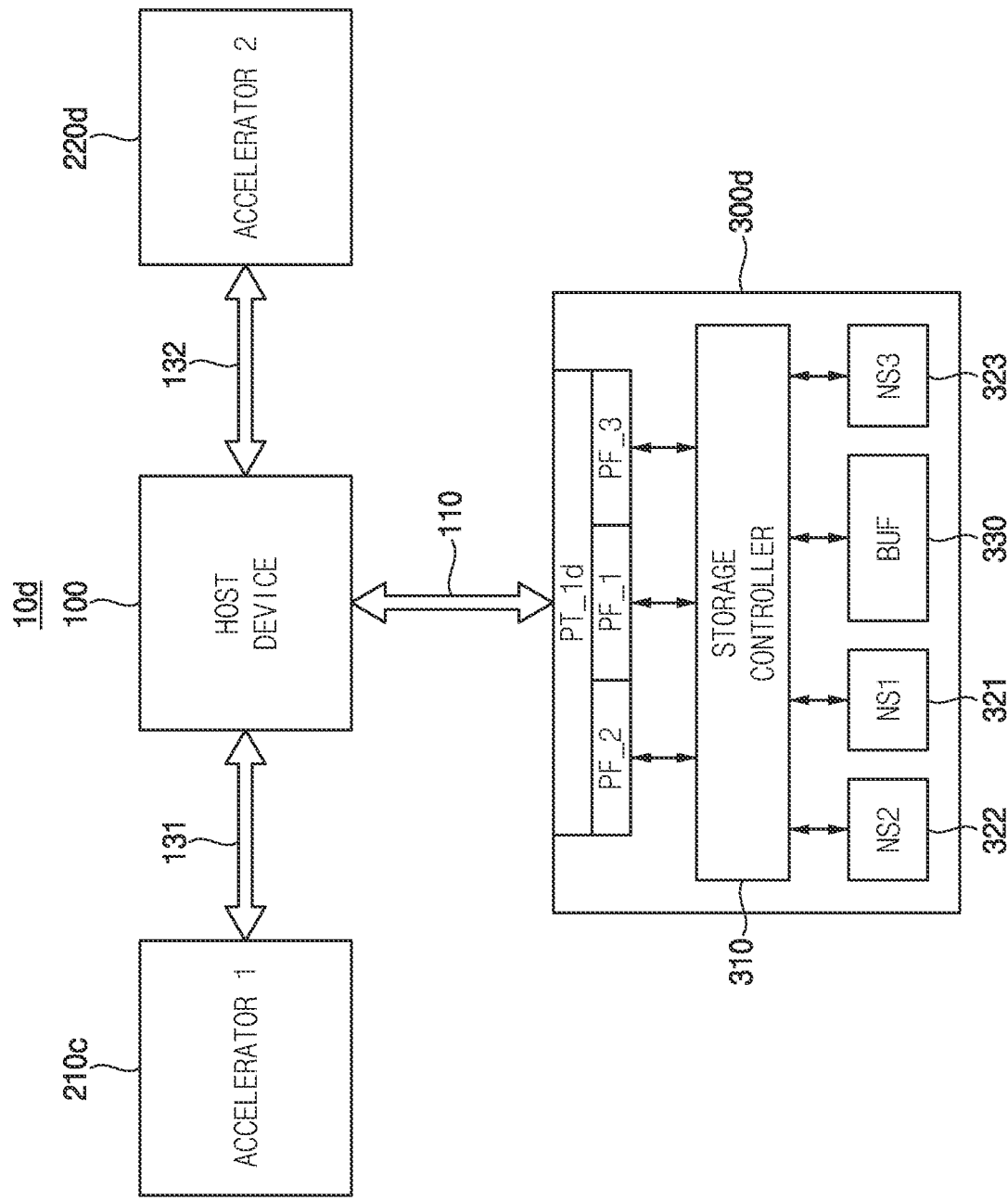

STORAGE DEVICE AND STORAGE SYSTEM FOR DIRECT STORAGE

CROSS-REFERENCE TO RELATED APPLICATION

This application claims priority under 35 USC § 119 to Korean Patent Application No. 10-2022-0162757 filed on Nov. 29, 2022 in the Korean Intellectual Property Office (KIPO), the contents of which are herein incorporated by reference in their entirety.

BACKGROUND

Example embodiments relate generally to semiconductor integrated circuits, and more particularly to storage devices for direct storage, and storage systems for direct storage.

One or more semiconductor memory devices may be used in data storage devices. Examples of such data storage devices include solid state drives (SSDs). SSDs typically use flash memory and function as secondary storage. SSDs have various design and/or performance advantages over hard disk drives (HDDs). Examples include the absence of moving mechanical parts, higher data access speeds, stability, durability, and/or low power consumption. Various systems, e.g., a laptop computer, a car, an airplane, a drone, etc., have adopted SSDs for data storage.

Storage devices may operate based on a plurality of requests and/or commands received from host devices. Recently, demand for direct storage is increasing for accelerators other than host devices to perform artificial intelligence (AI) learning, high-quality image processing, etc., and research has been conducted to implement direct storage.

SUMMARY

It is an aspect to provide a storage device capable of efficiently supporting a direct storage function.

It is another aspect to provide a storage system capable of efficiently supporting a direct storage function.

According to an aspect of one or more example embodiments, there is provided a storage device comprising one or more ports configured to form an electrical connection with an external device; one or more physical functions including physical resources, and exposed through the one or more ports to communicate with the external device; a storage controller configured to control an operation of the storage device, and to communicate with the external device through the one or more ports and the one or more physical functions; a plurality of nonvolatile memories controlled by the storage controller; and a first buffer memory controlled by the storage controller, wherein, when the storage device is accessed by the external device, the first buffer memory is used by the one or more ports and the one or more physical functions to temporarily store data for the external device.

According to another aspect of one or more example embodiments, there is provided a storage system comprising a host device; a first accelerator connected to the host device, and including a first buffer memory; and a storage device connected to the host device. The storage device includes one or more ports configured to form an electrical connection with at least one of the host device and the first accelerator; one or more physical functions including physical resources, exposed through the one or more ports to communicate with the host device and the first accelerator; a storage controller configured to control an operation of the storage device, and to communicate with the host device and the first accelerator through the one or more ports and the one or more physical functions; and a plurality of nonvolatile memories controlled by the storage controller, and configured to store data. When the storage device is accessed by the first accelerator, the first buffer memory is used by the one or more ports and the one or more physical functions to temporarily store data for the storage system.

According to yet another aspect of one or more example embodiments, there is provided a storage system comprising a host device; an accelerator connected to the host device, and including a first buffer memory configured to temporarily store data; a storage device connected to the host device; and a second buffer memory connected to the host device, and configured to temporarily store data. The storage device includes one or more ports configured to form an electrical connection with at least one of the host device and the accelerator; a first physical function and a second physical function, each including physical resources, exposed through the one or more ports to communicate respectively with the host device and the accelerator, respectively; a storage controller configured to control an operation of the storage device, and to communicate with the host device and the accelerator through the one or more ports and the first physical function and the second physical function; a plurality of nonvolatile memories controlled by the storage controller; and a third buffer memory controlled by the storage controller, and configured to temporarily store data. When the one or more ports include a first port configured to form an electrical connection with the host device and a second port configured to form an electrical connection with the accelerator, the first physical function is exposed through the first port, the second physical function is exposed through the second port, and the accelerator is directly connected to the second port of the storage device. When the one or more ports include only the first port configured to form the electrical connection with the host device, the first physical function and the second physical function are exposed through the first port, and the accelerator is connected to the storage device through the first port and the host device. When the storage device is accessed by the accelerator, the accelerator exchanges data with the storage device using one of the first buffer memory and the third buffer memory and through the second physical function and the one or more ports, without using the second buffer memory.

BRIEF DESCRIPTION OF THE DRAWINGS

Illustrative, non-limiting example embodiments will be more clearly understood from the following detailed description taken in conjunction with the accompanying drawings.

FIG. 3 is a block diagram illustrating an example of a nonvolatile memory included in a storage device according to some example embodiments.

FIG. 12 is a block diagram illustrating an example of a storage device and a storage system of FIG. 1.

DETAILED DESCRIPTION

Figure 1:
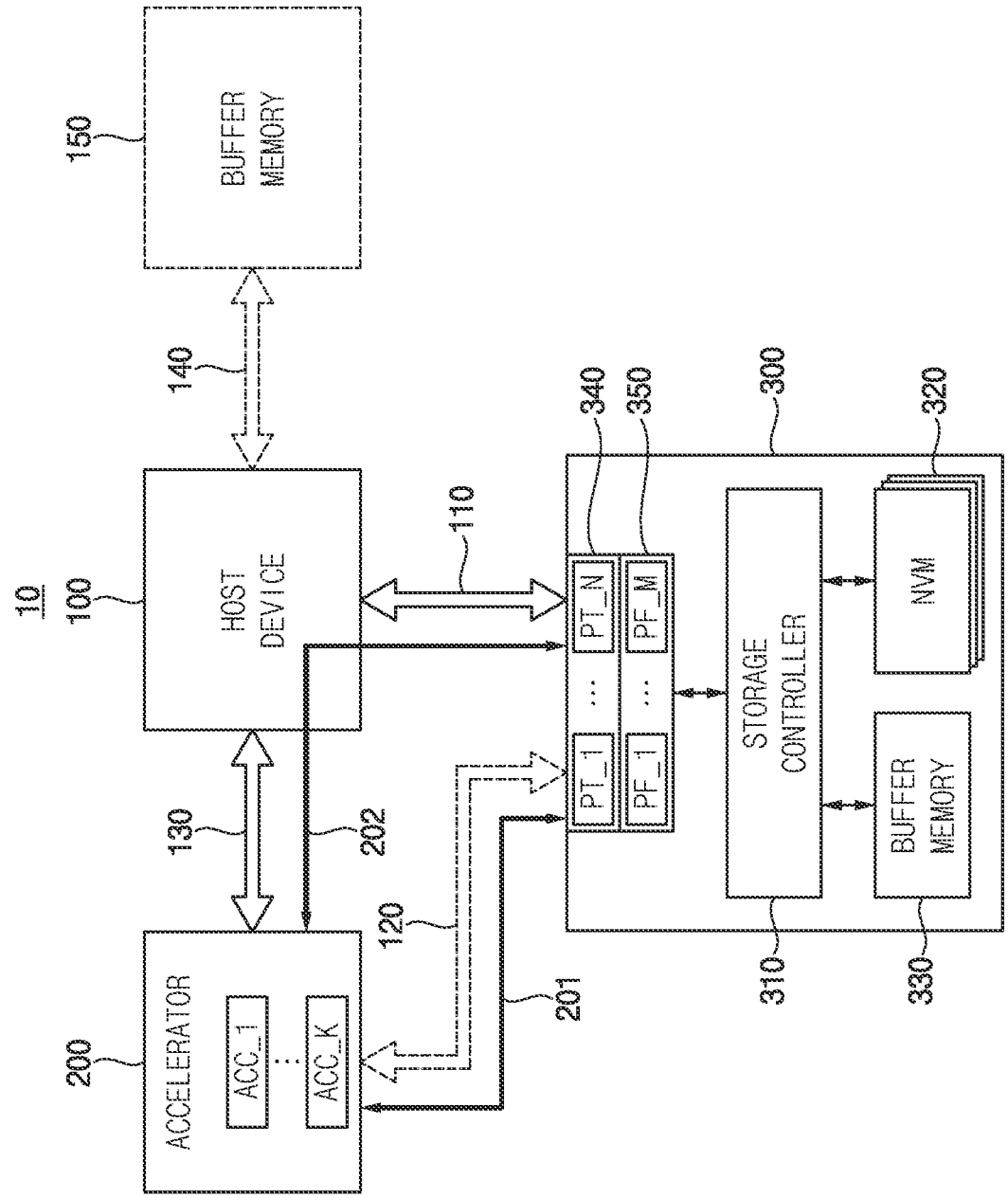
FIG. 1 is a block diagram illustrating a storage device and a storage system including the storage device according to some example embodiments.

In a storage device and a storage system according to some example embodiments, the storage device may be implemented with a multi-port structure including one or more ports and/or a multi-physical function structure including one or more physical functions, the storage device and/or the storage system may operate based on a CXL protocol, and an accelerator may directly exchange data with the storage device using a buffer memory inside the storage device or inside the accelerator. Accordingly, a direct storage function in which the storage device is accessed without using a system buffer memory may be efficiently implemented.

Various example embodiments will be described more fully with reference to the accompanying drawings, in which various embodiments are shown. The present disclosure may, however, be embodied in many different forms and should not be construed as limited to the embodiments set forth herein. Like reference numerals refer to like elements throughout this application.

FIG. 1 is a block diagram illustrating a storage device and a storage system including the storage device according to some example embodiments.

Referring to FIG. 1, a storage system 10 includes a host device 100, one or more accelerators 200, and a storage device 300. In some example embodiments, the storage system 10 may further include buses 110, 120, 130 and 140, and a buffer memory 150.

The host device 100 controls overall operations of the storage system 10. For example, the host device 100 may include at least one of various processing units, e.g., a central processing unit (CPU), microprocessor, microcontroller, etc.

Although not illustrated in detail, the host device 100 may include a host processor and a host memory. The host processor may control an operation of the host device 100. For example, the host processor may execute an operating system (OS). The operating system may include, for example, a file system for file management and a device driver for controlling peripheral devices including the one or more accelerators 200 and the storage device 300 at the operating system level. The host memory may store instructions and/or data that are executed and/or processed by the host processor.

The buffer memory 150 may store instructions and/or data that are executed and/or processed by the host device 100 and/or the one or more accelerators 200, and may temporarily store data stored in or to be stored into the storage device 300. For example, the buffer memory 150 may include at least one of various volatile memories, e.g., a dynamic random access memory (DRAM), etc. The buffer memory 150 may be located or disposed outside the host device 100, the one or more accelerators 200, and the storage device 300. The buffer memory 150 may be referred to as a system buffer memory or a host buffer memory.

The one or more accelerators 200 are connected to the host device 100, and perform operations independently of the host device 100. For example, the one or more accelerators 200 may perform artificial intelligence (AI) learning, high-quality (or high-definition or high resolution) image processing, and/or the like.

The one or more accelerators 200 may include first to K-th accelerators ACC_1, . . . , ACC_K, where K is a natural number greater than or equal to two. For example, each of the first to K-th accelerators ACC_1 to ACC_K may include a processing unit having a type different from that of the processing unit included in the host device 100. For example, each of the first to K-th accelerators ACC_1 to ACC_K may include at least one of various processing units, e.g., a graphic processing unit (GPU), a tensor processing unit (TPU), a neural processing unit (NPU), a vision processing unit (VPU), an artificial intelligence (AI) engine, etc.

The storage device 300 is accessed by the host device 100 and/or the one or more accelerators 200. The storage device 300 includes a storage controller 310, a plurality of nonvolatile memories (NVMs) 320, a buffer memory 330, one or more ports 340, and one or more physical functions (PFs) 350.

The storage controller 310 controls an operation of the storage device 300. For example, the storage controller 310 may control operations of the plurality of nonvolatile memories 320 based on requests and data received from the host device 100 and/or the one or more accelerators 200.

The plurality of nonvolatile memories (NVMs) 320 are controlled by the storage controller 310 and store a plurality of data. For example, the plurality of nonvolatile memories 320 may store meta data, various user data, etc.

In some example embodiments, each of the plurality of nonvolatile memories 320 may include a NAND flash memory. In some example embodiments, each of the plurality of nonvolatile memories 320 may include one of, for example, an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

In some example embodiments, as will be described with reference to FIG. 4, the storage device 300 implemented with one physical device and may be partitioned or divided into a plurality of logical storage areas or logical devices, and each logical storage area may be used as a separate, individual and/or independent storage space.

The buffer memory 330 is controlled by the storage controller 310, stores instructions and/or data that are executed and/or processed by the storage controller 310, and temporarily stores data stored in or to be stored into the plurality of nonvolatile memories 320. For example, the buffer memory 330 may include at least one of various volatile memories, e.g., a static random access memory (SRAM), a DRAM, etc. The buffer memory 330 may be referred to as a storage buffer memory.

The one or more ports 340 are components for electrical connection with external devices, such as the host device 100 and/or the one or more accelerators 200 located outside the storage device 300. That is, the one or more ports 340 are electrically connected to one or more external devices such as the host device 100 and/or the one or more accelerators 200 located outside the storage device 300.

The one or more physical functions (PFs) 350 include physical resources, are exposed through the one or more ports 340, and are used to communicate with the external devices, such as the host device 100 and/or the one or more accelerators 200. In other words, the one or more physical functions 350 are components for communication with the external devices by exposure through the one or more ports 340. The storage controller 310 communicates with the external devices through the one or more ports 340 and the one or more physical functions 350. For example, the external devices may include the host device 100 and the one or more accelerators 200.

The one or more ports 340 may include first to N-th ports PT_1, . . . , PT_N, where N is a natural number greater than or equal to two. The one or more physical functions 350 may include first through M-th physical functions PF_1, . . . , PF_M, where M is a natural number greater than or equal to two. In some example embodiments, as will be described with reference to FIG. 5, the number of the ports PT_1 to PT_N and the number of the physical functions PF_1 to PF_M may be equal to each other (e.g., N=M). In some example embodiments, as will be described with reference to FIG. 9, the number of the ports PT_1 to PT_N may be fewer than the number of the physical functions PF_1 to PF_M (e.g., N<M).

The host device 100 and the storage device 300 may be electrically connected to each other through the bus 110. The one or more accelerators 200 and the storage device 300 may be electrically connected to each other through the bus 120. In some example embodiments, as will be described with reference to FIG. 9, the bus 120 may be omitted or removed. The host device 100 and the one or more accelerators 200 may be electrically connected to each other through the bus 130. The host device 100 and the buffer memory 150 may be electrically connected to each other through the bus 140. For example, each of the buses 110, 120, 130 and 140 may include one or more physical lanes.

In the storage system 10 according to some example embodiments, the one or more accelerators 200 are implemented to support a direct storage function (or simply direct storage) in which the one or more accelerators 200 accesses the storage device 300 without using the buffer memory 150 located outside the storage device 300. For example, when the storage device 300 is accessed by the one or more accelerators 200, the buffer memory 330 located inside the storage device 300 may be used as a buffer memory for the one or more accelerators 200 and the storage system 10 by the one or more ports 340 and the one or more physical functions 350. For example, the one or more accelerators 200 may exchange data with the storage device 300 using the one or more ports 340, the one or more physical functions 350 and the buffer memory 330 (e.g., storage buffer memory) that are included in the storage device 300, without using (or passing through) the buffer memory 150 (e.g. system buffer memory) that is located outside the storage device 300. With respect to the above-described direct storage function, the buffer memory 150 outside the storage device 300 may be unnecessary, and thus in some example embodiments, the buffer memory 150 and the bus 140 may be omitted from the following figures.

In some example embodiments, as will be described with reference to FIG. 5, when the one or more accelerators 200 are directly connected to the storage device 300, the above-described direct storage function may be implemented through a first path 201 including the bus 120. In some example embodiments, as will be described with reference to FIG. 9, when the one or more accelerators 200 are not directly connected to the storage device 300, the above-described direct storage function may be implemented through a second path 202 including the buses 110 and 130 and the host device 100.

In some example embodiments, to support the above-described direct storage function, the storage device 300 may operate based on compute express link (CXL). For example, the storage device 300 may be a CXL storage device supporting the CXL protocol. The CXL protocol is an open standard for high-speed central processing unit (CPU)-to-device and CPU-to-memory connections, designed for high performance data center computers. The CXL protocol is built on peripheral component interconnect (PCI) express (PCIe) physical and electrical interface with protocols in three areas: input/output (I/O), memory, and cache coherence. For example, when the CXL protocol is applied or employed, the host device 100 and the one or more accelerators 200 may use the buffer memory 330 in the storage device 300 as an external buffer memory, and may directly access the buffer memory 330 via a direct memory access (DMA) according to the CXL protocol.

In some example embodiments, data and/or signal transmissions between the host device 100, the buffer memory 150, the one or more accelerators 200 and the storage device 300 may be implemented based on the PCIe protocol. For example, the buses 110, 120, 130 and 140 may be PCIe buses. However, example embodiments are not limited thereto, and in some example embodiments, data and/or signal transmissions between the host device 100, the buffer memory 150, the one or more accelerators 200 and the storage device 300 may be implemented based on at least one of various protocols, e.g., advanced technology attachment (ATA), serial ATA (SATA), parallel ATA (PATA), small computer small interface (SCSI), serial attached SCSI (SAS), nonvolatile memory express (NVMe), etc.

Devices, such as PCIe devices, expose various functions that may be accessed by other components in a system (e.g., computing system). For example, a host device may use such functions exposed by a storage device to perform various operations within the storage device. These functions may operate on data stored on the storage device, or may operate on data provided by the host device. Typically, the functions exposed by the devices may relate to normal operations of the device (e.g., data storage operation of the storage device).

Functions may be classified into two categories: physical functions and virtual functions. The physical functions (PFs) may be implemented using hardware within the device. Resources of the physical functions may be managed and configured independently any other physical functions offered by the device. The virtual functions (VFs) are lightweight functions that may be thought of as virtualized functions. Unlike physical functions, a virtual function may be typically associated with a particular physical function, and typically may share resources with its associated physical function (and possibly with other virtual functions associated with the physical function as well).

The physical functions may be independent of any other functions (physical or virtual). That is to say, the physical functions may have their own, dedicated physical resources such as memory buffers. For a device to support a large number of physical functions, the logic area, power consumption, and complexity of the underlying device may increase. Thus, to reduce cost and complexity on the device side, the virtual functions may be used or supported. The virtual functions may share physical resources with the physical functions and may dependent upon physical functions for all the physical aspects. These physical aspects include link control, device control, power management, etc. Although the virtual functions lower the cost and complexity on the device side, the virtual functions may add to the complexity on the system software side. The system software needs to support single root input/output virtualization (SR-IOV) protocol to be able to communicate with virtual functions. This added functionality at times may lower I/O performance in terms of extra latency. Thus, it is advantageous to have the physical functions from the system software point of view.

Although example embodiments are described using an example in which the direct storage function is implemented using the physical functions, example embodiments are not limited thereto. For example, in some example embodiments, the physical functions 350 may be replaced with virtual functions, or in some example embodiments, the direct storage function may be implemented using both the physical functions 350 and the virtual functions.

In some example embodiments, the storage device 300 may be a solid state drive (SSD), a universal flash storage (UFS), a multi-media card (MMC) or an embedded MMC (eMMC). In some example embodiments, the storage device 300 may be one of a secure digital (SD) card, a micro SD card, a memory stick, a chip card, a universal serial bus (USB) card, a smart card, a compact flash (CF) card, or the like.

In some example embodiments, the storage system 10 may be any computing system, such as a personal computer (PC), a server computer, a data center, a workstation, a digital television, a set-top box, a navigation system, etc. In other example embodiments, the storage system 10 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IOT) device, an internet of everything (IoE) device, an e-book reader, a virtual reality (VR) device, an augmented reality (AR) device, a robotic device, a drone, an automotive, etc.

As the amount of data that a system (e.g., computing system) has to process increases significantly, some of tasks or operations to be processed by a host device (e.g., CPU) has been off-loaded to other processing units such as an accelerator (e.g., GPU). When some tasks are off-loaded from the host device to other processing units, the processing speed of the system may be improved or enhanced. In the related art, the accelerator should use at least one of the host device and a system buffer memory to access the storage device, and this configuration causes some disadvantages in that the system performance is degraded or deteriorated.

The storage device 300 according to some example embodiments may be implemented with a multi-port structure including the one or more ports 340 and/or a multi-physical function structure including the one or more physical functions 350. For example, the storage device 300 may operate based on the CXL protocol. The one or more accelerators 200 may be directly connected to the storage device 300 based on the multi-port structure, and/or may directly exchange data with the storage device 300 using the buffer memory 330 inside the storage device 300 based on the multi-physical function structure. Accordingly, the direct storage function in which the storage device 300 is accessed without using the buffer memory 150 outside the storage device 300 may be efficiently implemented.

Figure 2:
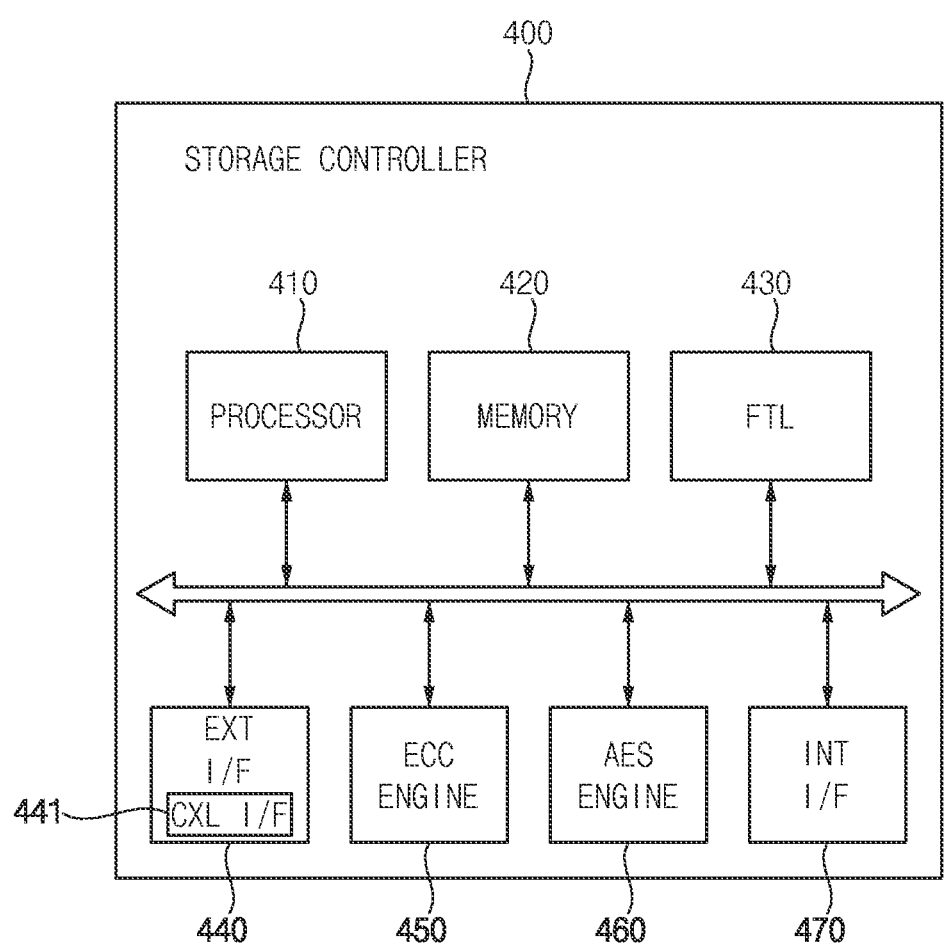
FIG. 2 is a block diagram illustrating an example of a storage controller included in a storage device according to some example embodiments.

FIG. 2 is a block diagram illustrating an example of a storage controller included in a storage device according to some example embodiments.

Referring to FIG. 2, a storage controller 400 may include a processor 410, a memory 420, a flash translation layer (FTL) 430, an external interface (EXT I/F) 440, an error correction code (ECC) engine 450, an advanced encryption standard (AES) engine 460, and an internal interface (INT I/F) 470. For example, the storage controller 400 may correspond to the storage controller 310 in FIG. 1.

The processor 410 may control an operation of the storage controller 400. For example, the processor 410 may control an operation of a storage device (e.g., the storage device 300 in FIG. 1), and may control respective components by employing firmware for operating the storage device.

The memory 420 may store instructions and data executed and processed by the processor 410. For example, the memory 420 may be implemented with a volatile memory, such as a DRAM, a SRAM, a cache memory, or the like.

The FTL 430 may perform various functions, such as an address mapping operation, a wear-leveling operation, a garbage collection operation, or the like. The address mapping operation may be an operation of converting a logical address received from an external device (e.g., the host device 100 and/or the one or more accelerators 200 in FIG. 1) into a physical address used to actually store data in a nonvolatile memory (e.g., the nonvolatile memory 320 in FIG. 1). The wear-leveling operation may be a technique for preventing excessive deterioration of a specific block by allowing blocks of the nonvolatile memory to be uniformly used. As an example, the wear-leveling operation may be implemented using a firmware technique that balances erase counts of physical blocks. The garbage collection operation may be a technique for ensuring usable capacity in the nonvolatile memory by erasing an existing block after copying valid data of the existing block to a new block.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The AES engine 460 may perform at least one of an encryption operation and a decryption operation on data input to the storage controller 400 by using a symmetric-key algorithm. Although not illustrated in detail, the AES engine 460 may include an encryption module and a decryption module. For example, the encryption module and the decryption module may be implemented as separate modules. For another example, one module capable of performing both encryption and decryption operations may be implemented in the AES engine 460.

The external interface (EXT I/F) 440 may provide a connection between the storage device (e.g., the storage device 300 in FIG. 1) and the external device (e.g., the host device 100 and/or the one or more accelerators 200 in FIG. 1). For example, the external interface 440 may provide an interface based on the PCIe protocol. For example, the external interface 440 may include a CXL interface (CXL I/F) 441 for supporting the CXL protocol.

The internal interface (INT I/F) 470 may provide a connection with an internal memory (e.g., the nonvolatile memories 320 and/or the buffer memory 330 in FIG. 1). For example, the internal interface 470 may be configured to comply with a standard protocol, such as Toggle or open NAND flash interface (ONFI).

FIG. 3 is a block diagram illustrating an example of a nonvolatile memory included in a storage device according to some example embodiments.

Referring to FIG. 3, a nonvolatile memory 500 may include a memory cell array 510, an address decoder 520, a page buffer circuit 530, a data input/output (I/O) circuit 540, a voltage generator 550 and a control circuit 560.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may include a charge trap layer. The following patent documents and patent application publication documents, each of which being herein incorporated by reference in their entireties, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 may receive a command CMD and an address ADDR from an outside (e.g., from the storage controller 310 in FIG. 1), and may control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. The page buffer circuit 530 may store (or write) data DAT to be programmed into the memory cell array 510 or may read (or retrieve) data DAT sensed from the memory cell array 510. In this regard, the page buffer circuit 530 may operate as a write driver or a sensing amplifier depending on an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory included in the storage device according to some example embodiments is described based on a NAND flash memory, the nonvolatile memory according to some example embodiments may be any nonvolatile memory, e.g., a PRAM, a RRAM, a NFGM, a PoRAM, a MRAM, a FRAM, or the like.

Figure 4A:
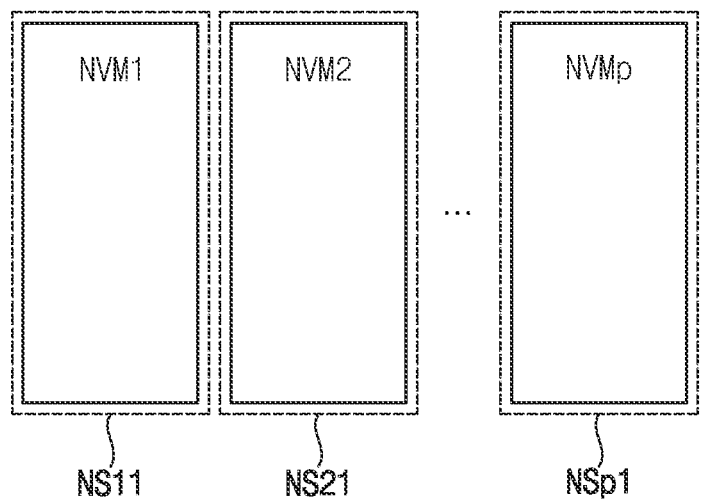
FIGS. 4A, 4B and 4C are diagrams for describing namespaces set in nonvolatile memories included in a storage device according to some example embodiments.
Figure 4B:
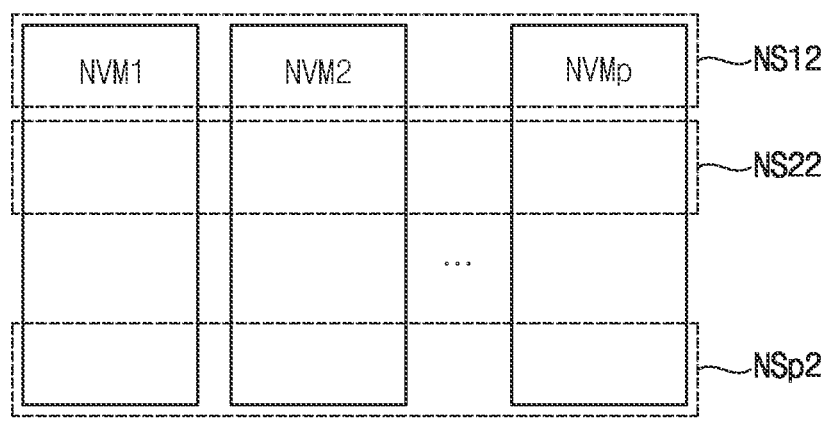
Figure 4C:
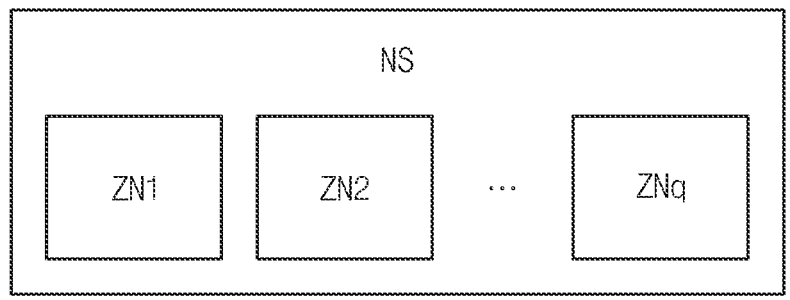

FIGS. 4A, 4B and 4C are diagrams for describing namespaces set on nonvolatile memories included in a storage device according to some example embodiments.

The storage device according to some example embodiments may support a namespace function and/or a zoned namespace (ZNS) function. When the namespace function is used, applied or employed, a storage device implemented with one physical device may be partitioned into a plurality of logical devices (e.g., a plurality of namespaces), and data may be managed based on the plurality of namespaces. When the zoned namespace function is used, applied or employed, one namespace may be additionally partitioned into a plurality of zones, and data may be managed based on the plurality of namespaces and the plurality of zones. All of the plurality of namespaces and the plurality of zones may be physically included in the same storage device, and each namespace and each zone may be used as a separate storage space.

Referring to FIG. 4A, an example of generating and setting a plurality of namespaces NS11, NS21, . . . , NSp1 on a plurality of nonvolatile memories NVM1, NVM2, . . . , NVMp is illustrated, where p is a natural number greater than or equal to two. For example, the plurality of nonvolatile memories NVM1 to NVMp may be included in one storage device, and thus the plurality of namespaces NS11 to NSp1 may also be included in one storage device.

In the example illustrated in FIG. 4A, one namespace may be generated and set in one nonvolatile memory. For example, the namespace NS11 may be generated and set in the entire region of the nonvolatile memory NVM1. In other words, there may be a one-to-one correspondence between namespaces and nonvolatile memories.

Referring to FIG. 4B, another example of generating and setting a plurality of namespaces NS12, NS22, . . . , NSp2 on a plurality of nonvolatile memories NVM1, NVM2, . . . , NVMp is illustrated. The descriptions repeated with FIG. 4A will be omitted.

In an example of FIG. 4B, one namespace may be generated and set in all of the plurality of nonvolatile memories NVM1 to NVMp. For example, the namespace NS12 may be generated and set in some regions of each of the plurality of nonvolatile memories NVM1 to NVMp. In other words, the namespace NS22 may include a region of the nonvolatile memory NVM1, a region of the nonvolatile NVM2, and a region of the nonvolatile NVMp, as shown in FIG. 4B.

Although not illustrated in FIGS. 4A and 4B, the operation of generating and setting the namespaces may be variously implemented according to some example embodiments. For example, the capacities of the namespaces NS11 to NSp1 and NS12 to NSp2 may be substantially equal to or different from each other. For example, the number of namespaces NS11 to NSp1 and NS12 to NSp2 and the number of nonvolatile memories NVM1 to NVMp may be substantially equal to or different from each other.

Referring to FIG. 4C, an example of generating and setting a plurality of zones ZN1, ZN2, . . . , ZNq on one namespace NS is illustrated, where q is a natural number greater than or equal to two. The namespace NS may correspond to one of the namespaces NS11 to NSp1 in FIG. 4A or the namespaces NS12 to NSp2 in FIG. 4B. That is, the namespace NS may correspond to the namespace NS11, or the namespace NS may correspond to the namespace NS22.

In some example embodiments, the operation of generating and setting the namespaces and/or the zones may be performed in advance at an initial operation time. In other example embodiments, the operation of generating and setting the namespaces and/or the zones may be performed in real-time or during runtime.

Figure 5:
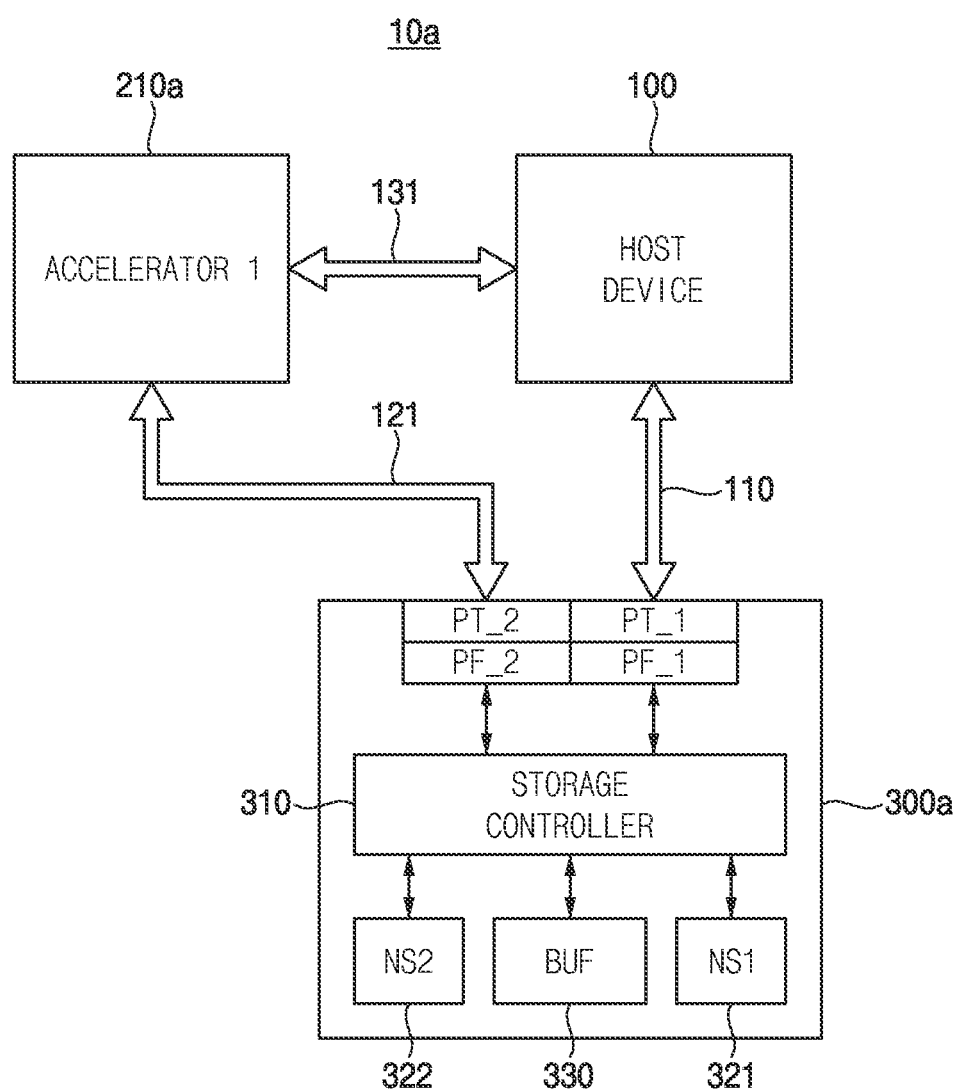
FIG. 5 is a block diagram illustrating an example of a storage device and a storage system of FIG. 1.
Figure 6A:
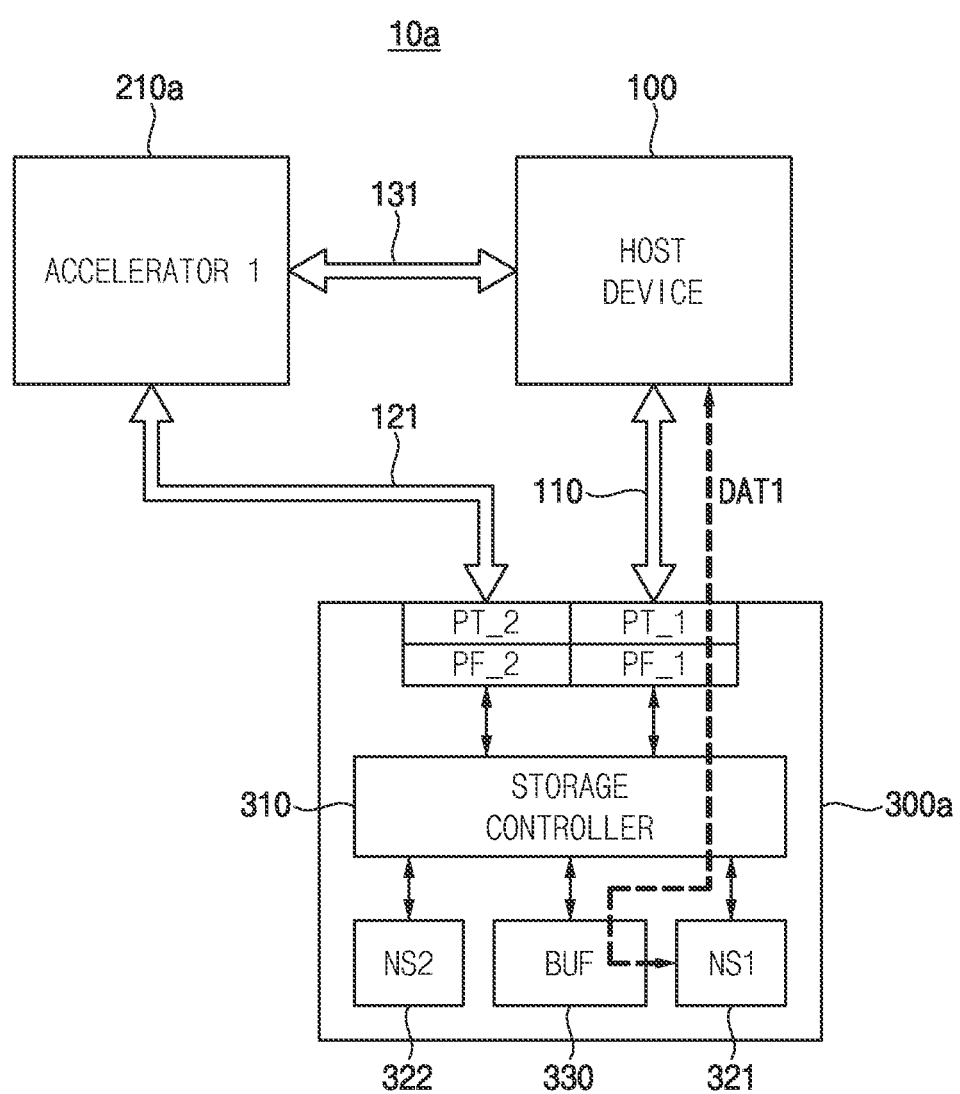
FIGS. 6A and 6B are diagrams for describing operations of a storage device and a storage system of FIG. 5.
Figure 6B:
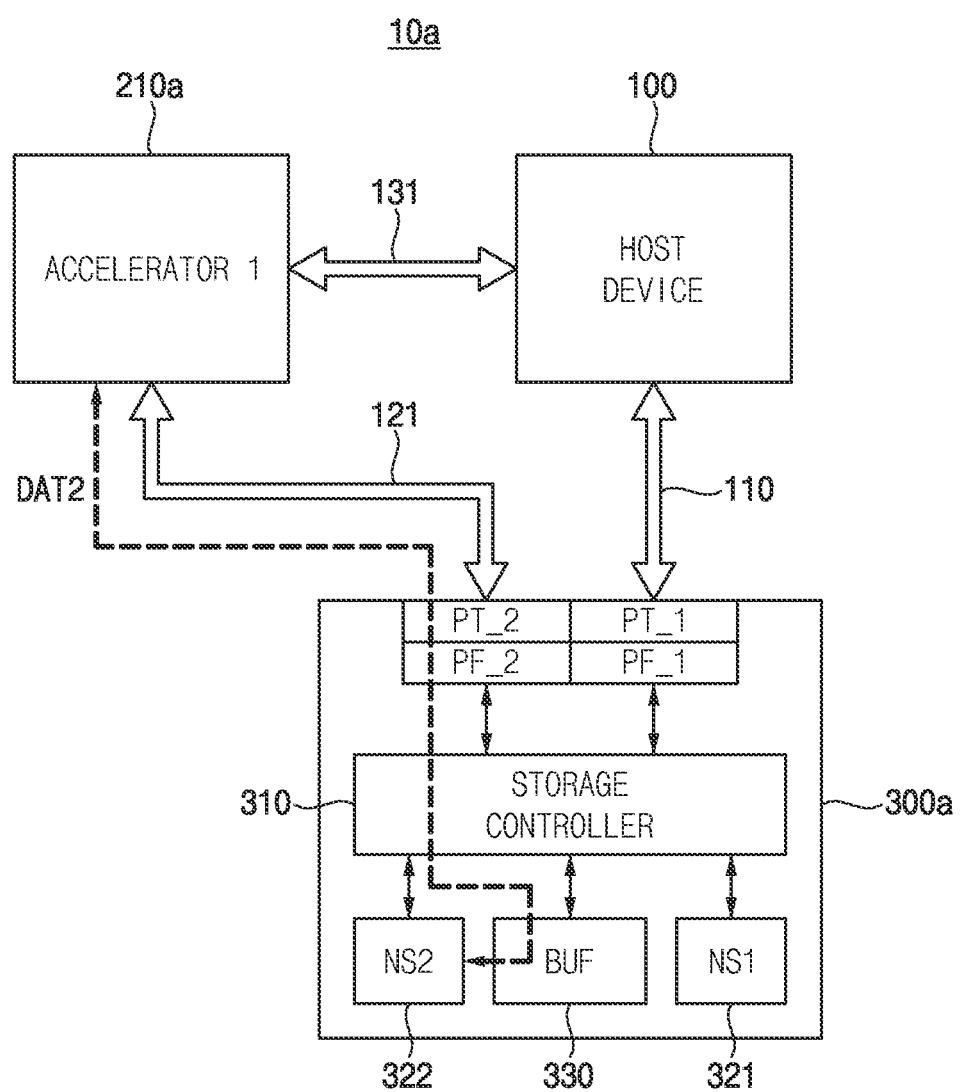

FIG. 5 is a block diagram illustrating an example of a storage device and a storage system of FIG. 1. FIGS. 6A and 6B are diagrams for describing operations of a storage device and a storage system of FIG. 5.

Referring to FIGS. 5, 6A and 6B, a storage system 10a may include a host device 100, a first accelerator 210a, a storage device 300a, and buses 110, 121 and 131. The storage device 300a may include a storage controller 310, a first namespace (NS1) 321 and a second namespace (NS2) 322, a buffer memory (BUF) 330, a first port PT_1 and a second port PT_2, and a first physical function PF_1 and a second physical function PF_2. For convenience of illustration, the bus 140 and the buffer memory 150 in FIG. 1 are omitted.

The host device 100, the bus 110, the storage controller 310 and the buffer memory (BUF) 330 may be substantially the same as those described with reference to FIG. 1, and thus a detailed description thereof is omitted for conciseness. The first accelerator 210a may be connected to the host device 100 through the bus 131.

The storage device 300a may be implemented with the multi-port structure and the multi-physical function structure. The one or more ports 340 may include the first port PT_1 for electrical connection with the host device 100, and the second port PT_2 for electrical connection with the first accelerator 210a. The one or more physical functions 350 may include the first physical function PF_1 that is exposed through the first port PT_1 for communication with the host device 100, and the second physical function PF_2 that is exposed through the second port PT_2 for communication with the first accelerator 210a. The first namespace 321 may be set in a first part or some of the plurality of nonvolatile memories 320, and may correspond to the first port PT_1 and the first physical function PF_1. The second namespace 322 may be set in a second part or others of the plurality of nonvolatile memories 320, and may correspond to the second port PT_2 and the second physical function PF_2.

The host device 100 may be directly connected to the storage device 300a through the first port PT_1 and the bus 110. Although not illustrated in detail, the host device 100 may include a port corresponding to the first port PT_1.

The storage device 300a may be accessed by the host device 100 using the bus 110, the first port PT_1, the first physical function PF_1 and the buffer memory 330. For example, as illustrated in FIG. 6A, when first data DAT1 is to be written into the first namespace 321 or is to be read from the first namespace 321, the host device 100 may directly exchange the first data DAT1 with the storage device 300a through the first port PT_1 using the bus 110, the first port PT_1, the first physical function PF_1, and the buffer memory 330. In some example embodiments, although not illustrated in detail, the host device 100 may use the buffer memory 150 rather than the buffer memory 330.

The first accelerator 210a may be directly connected to the storage device 300a through the second port PT_2 and the bus 121. Although not illustrated in detail, the first accelerator 210a may include a port corresponding to the second port PT_2.

The storage device 300a may be accessed by the first accelerator 210a using the bus 121, the second port PT_2, the second physical function PF_2 and the buffer memory 330. The first accelerator 210a may be implemented to support a direct storage function in which the first accelerator 210a accesses the storage device 300a without using the buffer memory 150. For example, as illustrated in FIG. 6B, when second data DAT2 is to be written into the second namespace 322 or is to be read from the second namespace 322, the first accelerator 210a may directly exchange the second data DAT2 with the storage device 300a through the second port PT_2 using bus 121, the second port PT_2, the second physical function PF_2 and the buffer memory 330.

In some example embodiments, the buses 110 and 121 in FIG. 5 may be physically separated, may include separate physical lanes, and may be implemented based on different protocols. For example, the bus 110 may be implemented based on PCIe Gen5×2 and the bus 121 may be implemented based on PCIe Gen6×2. However, example embodiments are not limited thereto.

Figure 7:
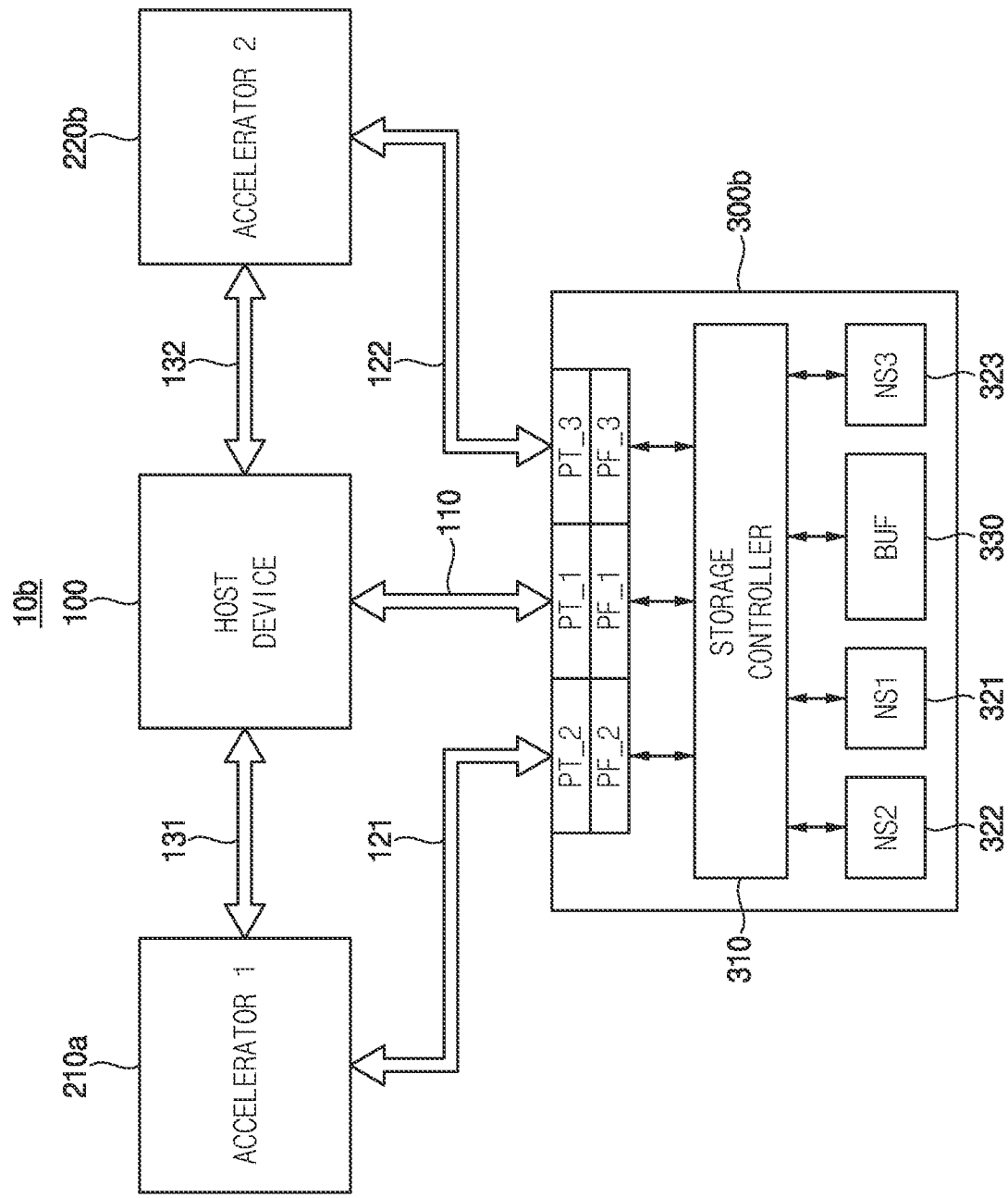
FIG. 7 is a block diagram illustrating an example of a storage device and a storage system of FIG. 1.
Figure 8:
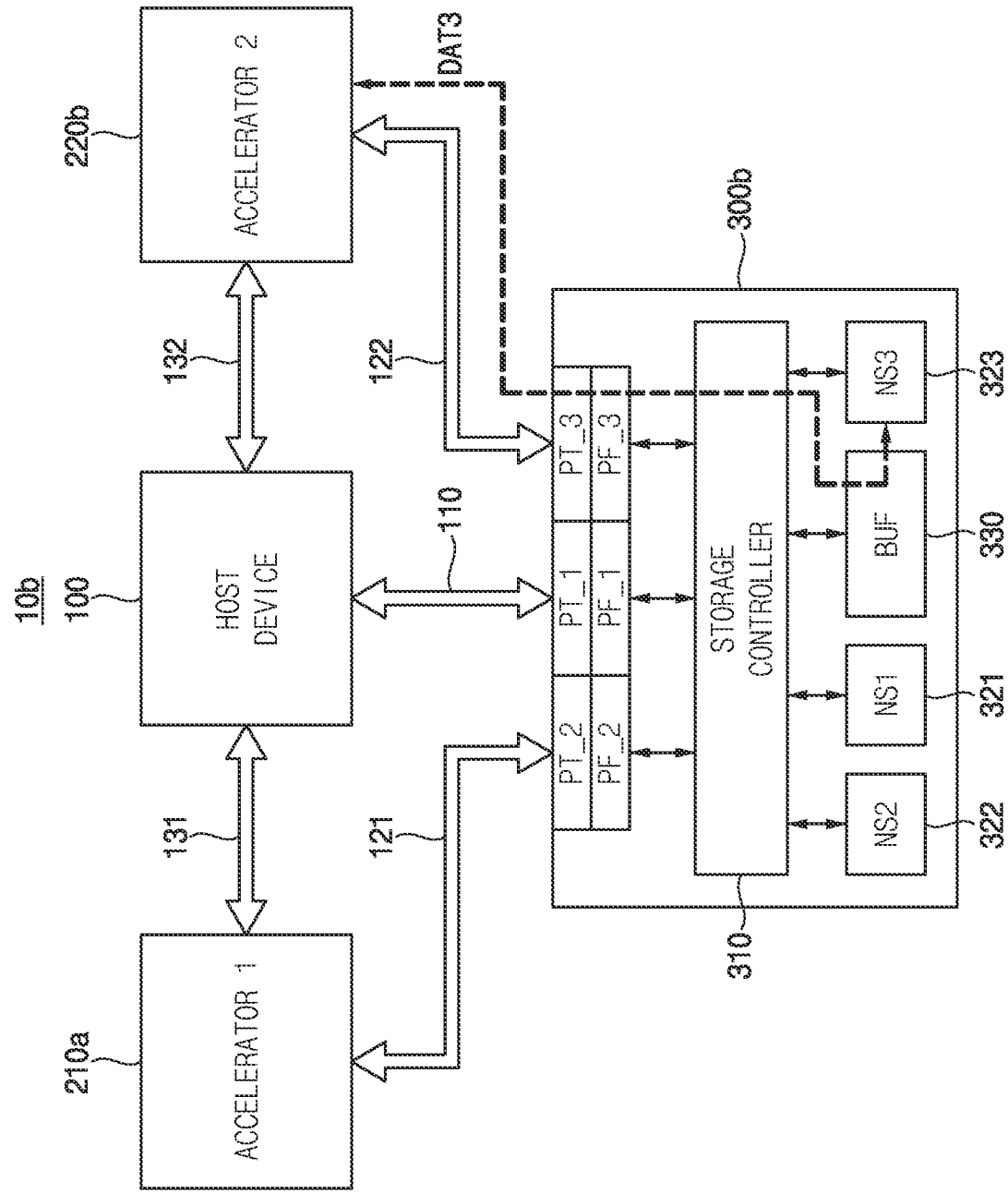
FIG. 8 is a diagram for describing operations of a storage device and a storage system of FIG. 7.

FIG. 7 is a block diagram illustrating an example of a storage device and a storage system of FIG. 1. FIG. 8 is a diagram for describing operations of a storage device and a storage system of FIG. 7. The descriptions repeated with FIGS. 5, 6A and 6B will be omitted for conciseness.

Referring to FIGS. 7 and 8, a storage system 10b may include a host device 100, a first accelerator 210a, a second accelerator 220b, a storage device 300b, and buses 110, 121, 122, 131 and 132. The storage device 300b may include a storage controller 310, first, second and third namespaces 321, 322 and 323, a buffer memory 330, first, second and third ports PT_1, PT_2 and PT_3, and first, second and third physical functions PF_1, PF_2 and PF_3.

The storage system 10b may be substantially the same as the storage system 10a of FIG. 5, except that the storage system 10b further includes the second accelerator 220b and the buses 122 and 132 and the storage device 300b further includes the third port PT_3, the third physical function PF_3 and the third namespace (NS3) 323.

The storage device 300b may be implemented with the multi-port structure and the multi-physical function structure. The one or more ports 340 may further include the third port PT_3 for electrical connection with the second accelerator 220b, and the one or more physical functions 350 may further include the third physical function PF_3 that is exposed through the third port PT_3 for communication with the second accelerator 220b. The third namespace 323 may be set in a third part or still others of the plurality of nonvolatile memories 320, and may correspond to the third port PT_3 and the third physical function PF_3.

The second accelerator 220b may be connected to the host device 100 through the bus 132, and may be directly connected to the storage device 300b through the third port PT_3 and the bus 122. The storage device 300b may be accessed by the second accelerator 220b using the bus 122, the third port PT_3, the third physical function PF_3 and the buffer memory 330. The second accelerator 220b may be implemented to support a direct storage function in which the second accelerator 220b accesses the storage device 300b without using the buffer memory 150. For example, as illustrated in FIG. 8, when third data DAT3 is to be written into the third namespace 323 or is to be read from the third namespace 323, the second accelerator 220b may directly exchange the third data DAT3 with the storage device 300b through the third port PT_3 using bus 122, the third port PT_3, the third physical function PF_3, and the buffer memory 330.

In the examples of FIGS. 5 and 7, the storage devices 300a and 300b may be implemented with a multi-port scheme in which PCIe lanes in a board are separated from each other, and the ports PT_1, PT_2 and PT_3 are separated from each other. In addition, the storage devices 300a and 300b may be implemented to support the CXL protocol. Therefore, the host device 100 may be physically bypassed, and latency may be reduced or optimized. However, since the lanes and the ports are physically separated, the performance (e.g., bandwidth) of the physical functions PF_1, PF_2 and PF_3 may be fixed, and it may be difficult to dynamically distribute the performance of the physical functions.

Figure 9:
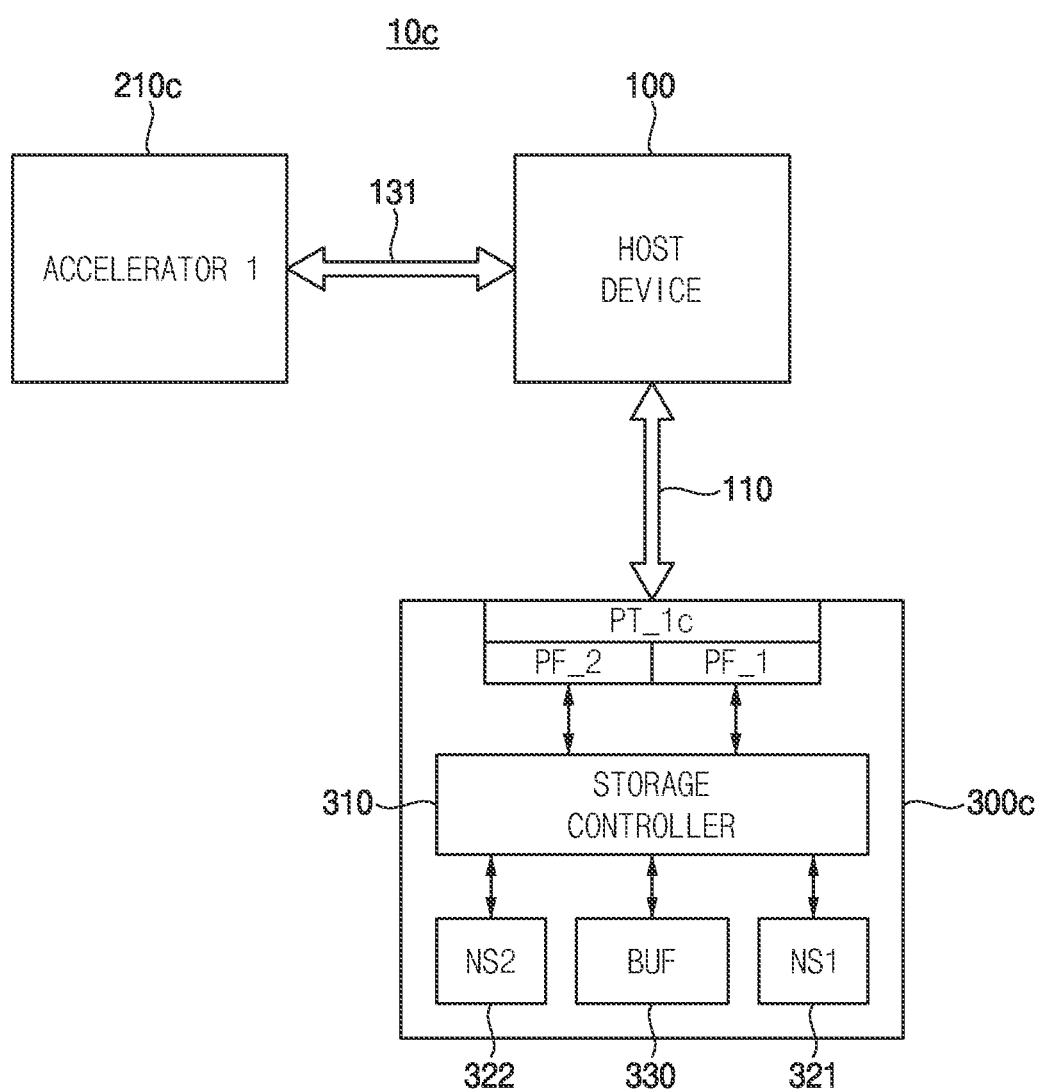
FIG. 9 is a block diagram illustrating an example of a storage device and a storage system of FIG. 1.

FIG. 9 is a block diagram illustrating an example of a storage device and a storage system of FIG. 1. FIGS. 10A, 10B, 11A and 11B are diagrams for describing operations of a storage device and a storage system of FIG. 9. The descriptions repeated with FIGS. 5, 6A and 6B will be omitted for conciseness.

Referring to FIGS. 9, 10A, 10B, 11A and 11B, a storage system 10c may include a host device 100, a first accelerator 210c, a storage device 300c, and buses 110 and 131. The storage device 300c may include a storage controller 310, first and second namespaces 321 and 322, a buffer memory 330, a first port PT_1c, and first and second physical functions PF_1 and PF 2.

The storage device 300c may be implemented with a single-port structure and a multi-physical function structure. The one or more ports 340 may include the first port PT_1c for electrical connection with the host device 100. The one or more physical functions 350 may include the first physical function PF_1 that is exposed through the first port PT_1c for communication with the host device 100, and the second physical function PF_2 that is exposed through the first port PT_1c for communication with the first accelerator 210c.

Figure 10A:
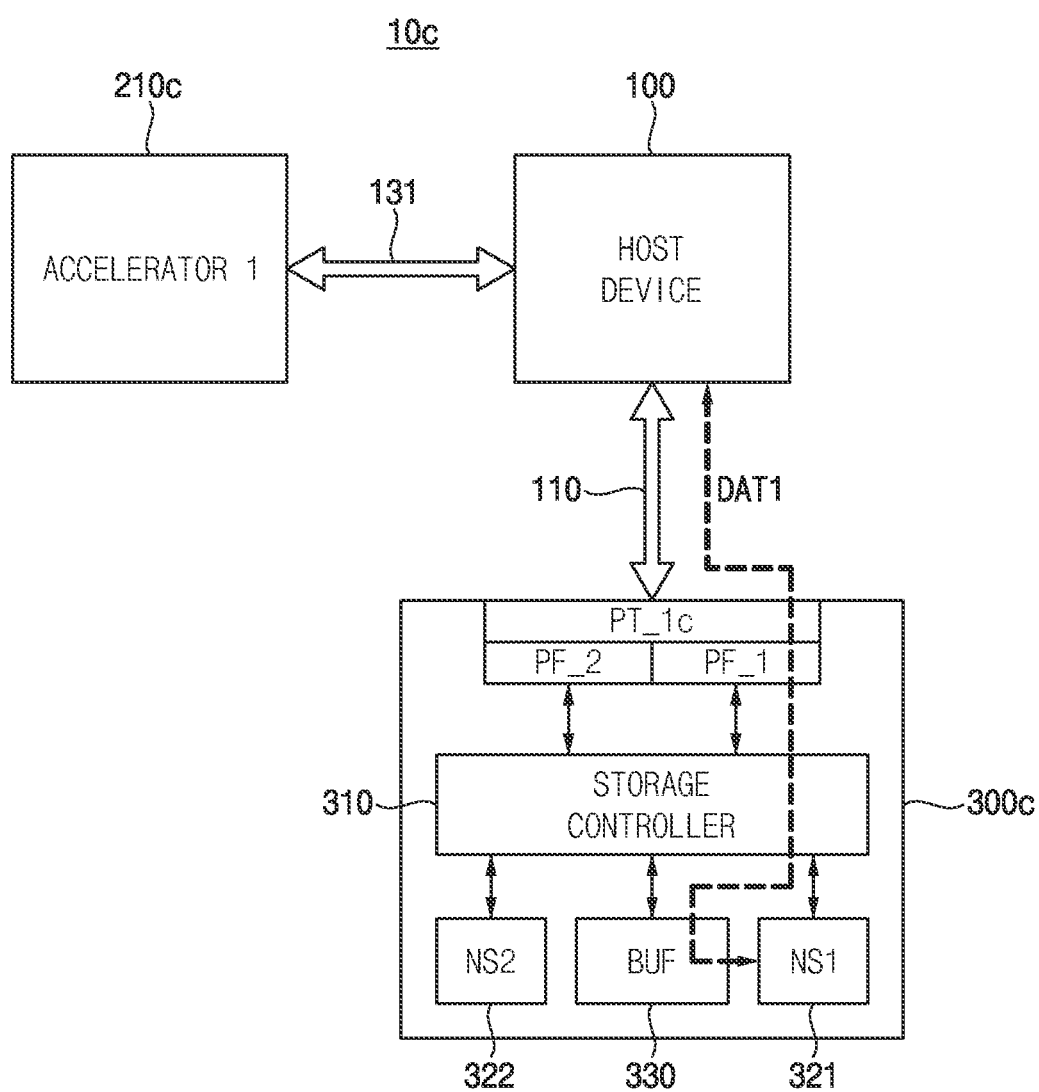
FIGS. 10A, 10B, 11A and 11B are diagrams for describing operations of a storage device and a storage system of FIG. 9.

The host device 100 may be directly connected to the storage device 300c through the first port PT_1c and the bus 110. As illustrated in FIG. 10A, the host device 100 may directly exchange the first data DAT1 with the storage device 300c through the first port PT_1c using bus 110, the first port PT_1c, the first physical function PF_1, and the buffer memory 330.

Figure 10B:
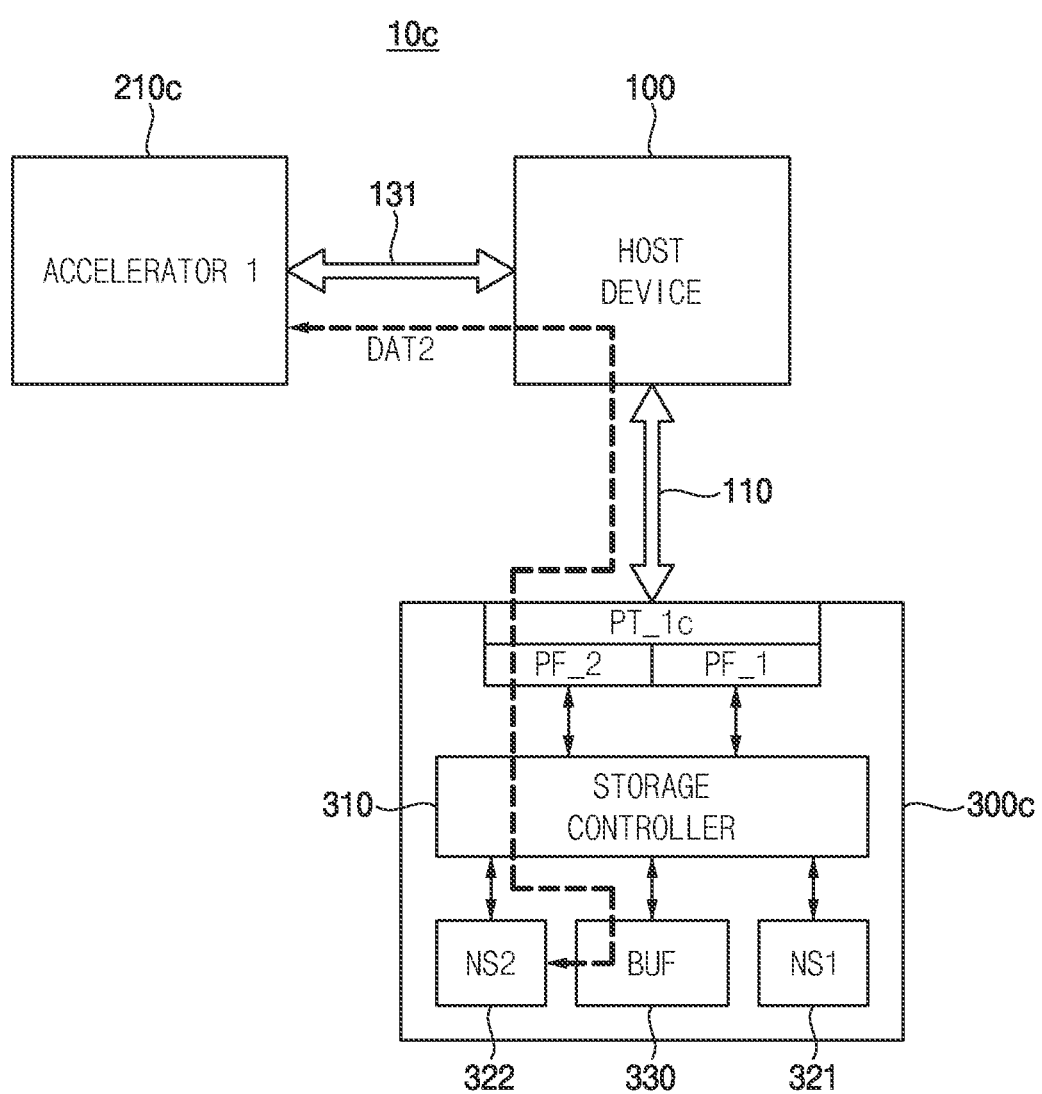

The first accelerator 210c may be connected to the storage device 300c through the first port PT_1c, the host device 100 and the buses 110 and 131. The storage device 300c may be accessed by the first accelerator 210c through the first port PT_1c using the bus 131, the host device 100, the bus 110, the first port PT_1c, the second physical function PF_2 and the buffer memory 330. The first accelerator 210c may be implemented to support the direct storage function in which the first accelerator 210c accesses the storage device 300c without using the buffer memory 150. For example, as illustrated in FIG. 10B, the first accelerator 210c may exchange the second data DAT2 with the storage device 300c through the first port PT_1c using the bus 131, the host device 100, the bus 110, the first port PT_1c, the second physical function PF_2, and the buffer memory 330.

In some example embodiments, the bus 110 in FIG. 9 may be implemented based on PCIe Gen6×4. However, example embodiments are not limited thereto.

Figure 11A:
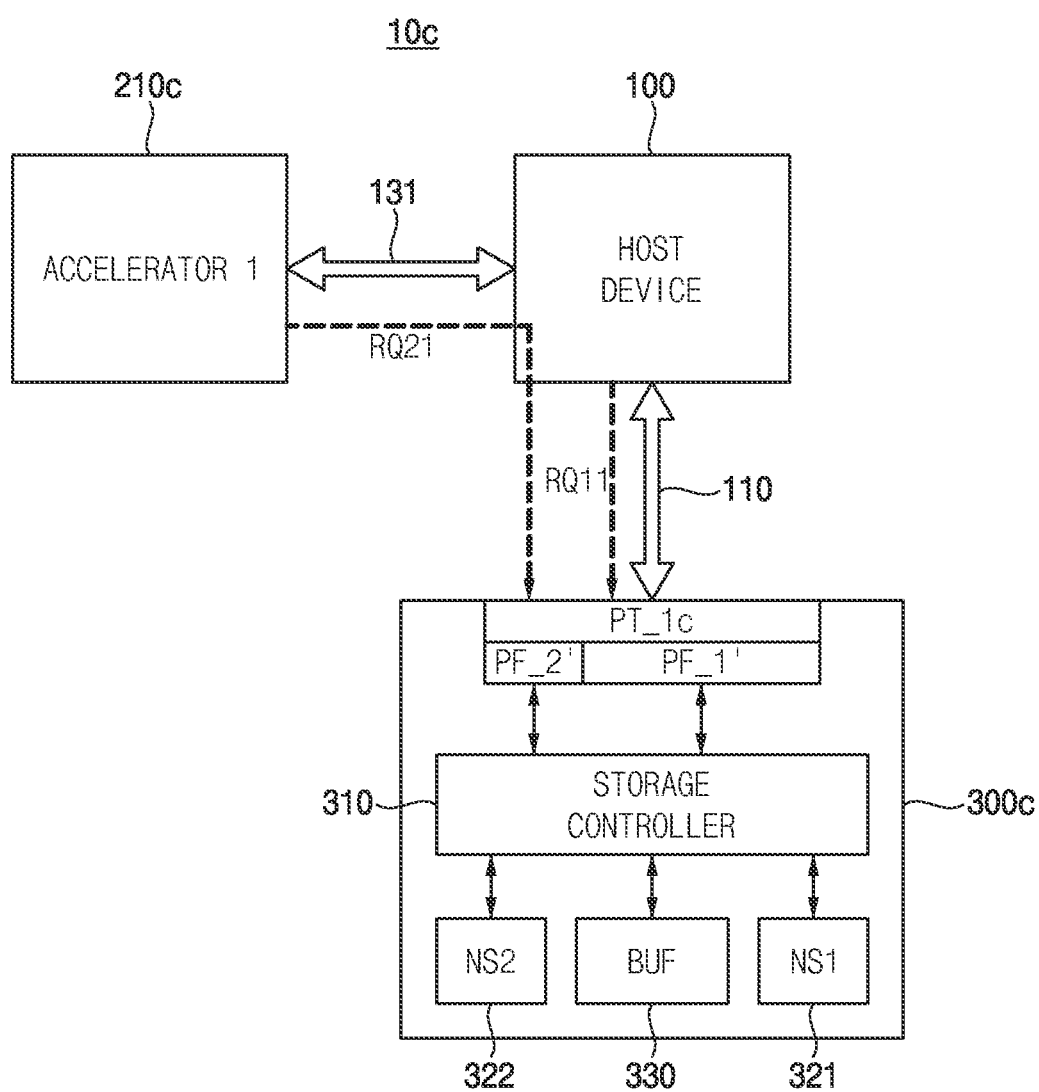
Figure 11B:
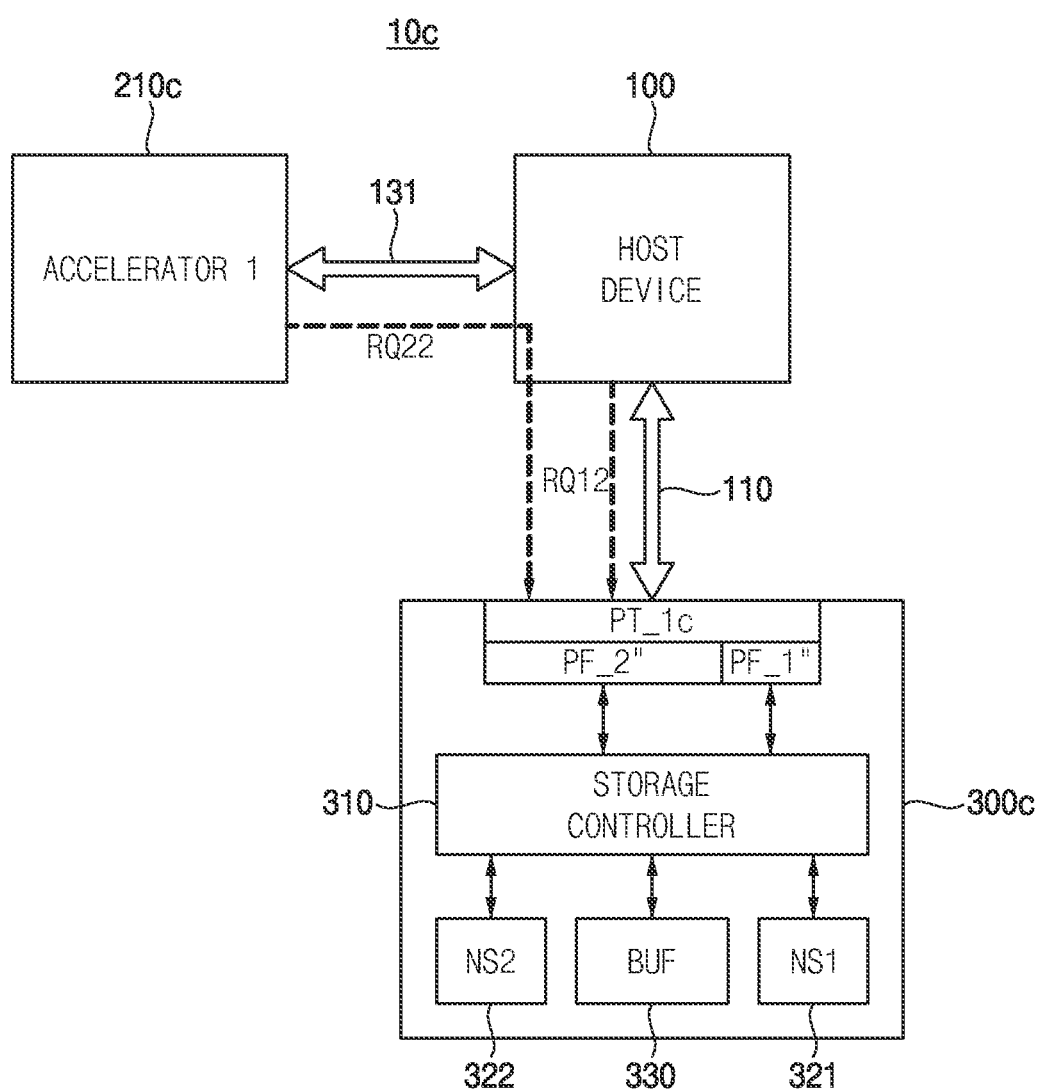

In some example embodiments, first performance by the first physical function PF_1 and second performance by the second physical function PF_2 may be dynamically and/or adaptively controlled or adjusted based on or under a control of at least one of the host device 100 and the first accelerator 210c. For example, as illustrated in FIG. 11A, based on at least one of a request RQ11 from the host device 100 and a request RQ21 from the first accelerator 210c, the first and second physical functions PF_1 and PF_2 may be adjusted to PF_1' and PF_2', respectively, such that the first performance increases and the second performance decreases. That is, in some example embodiments, the first performance of the direct storage function with the host device 110 may be increased while the second performance of the direct storage function with first accelerator 210c may be decreased. Alternatively, in some example embodiments as illustrated in FIG. 11B, based on at least one of a request RQ12 from the host device 100 and a request RQ22 from the first accelerator 210c, the first and second physical functions PF_1 and PF_2 may be adjusted to PF_1" and PF_2", respectively, such that the first performance decreases and the second performance increases. For example, FIG. 11A illustrates an example where the workload of the host device 100 increases, and FIG. 11B illustrates an example where the workload of the first accelerator 210c increases.

Figure 13:
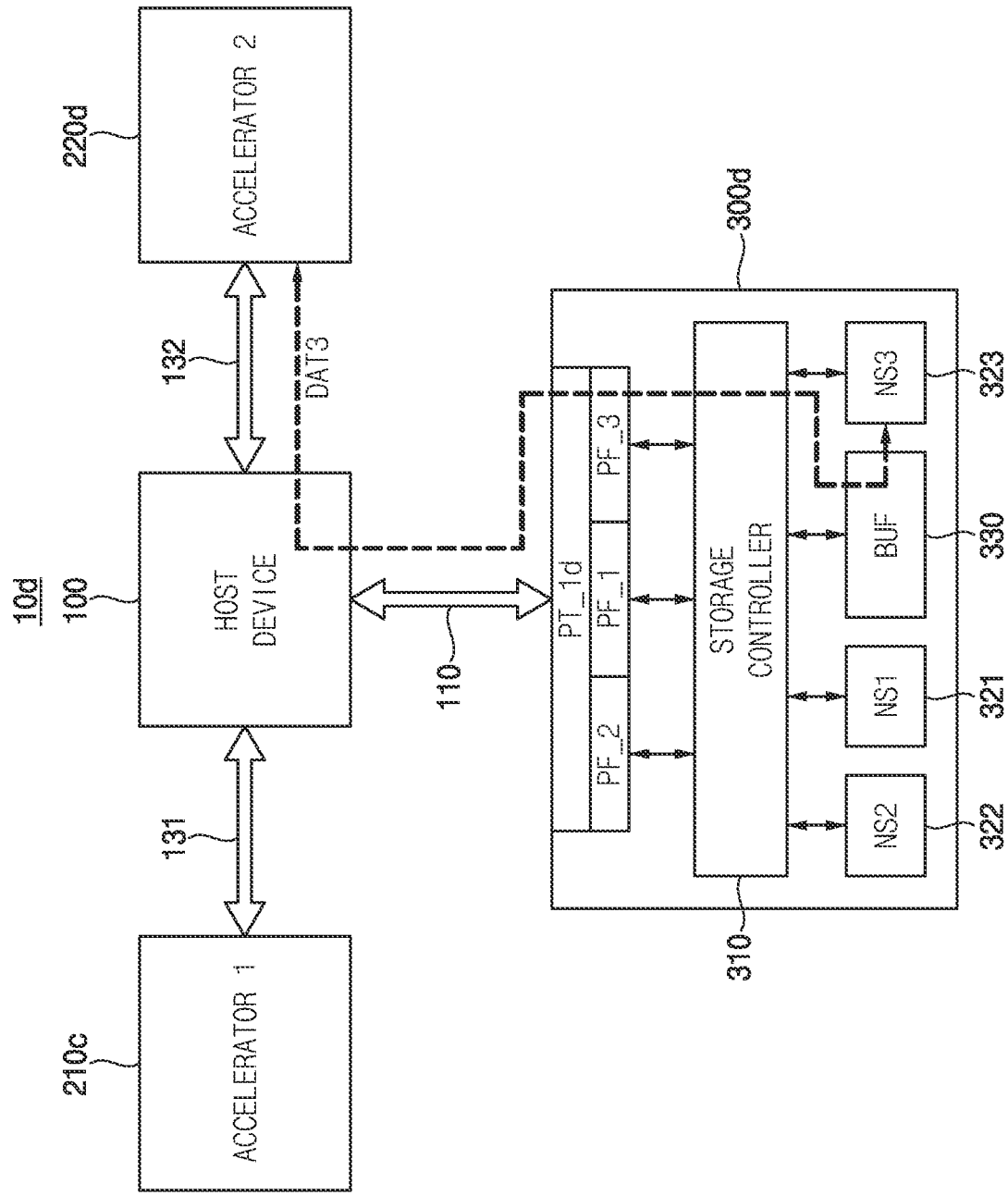
FIG. 13 is a diagram for describing operations of a storage device and a storage system of FIG. 12.

FIG. 12 is a block diagram illustrating an example of a storage device and a storage system of FIG. 1. FIG. 13 is a diagram for describing operations of a storage device and a storage system of FIG. 12. The descriptions repeated with FIGS. 7, 8, 9, 10A, 10B, 11A and 11B will be omitted for conciseness.

Referring to FIGS. 12 and 13, a storage system 10d may include a host device 100, a first accelerator 210c, a second accelerator 220d, a storage device 300d, and buses 110, 131 and 132. The storage device 300d may include a storage controller 310, first, second and third namespaces 321, 322 and 323, a buffer memory 330, a first port PT_1d, and first, second and third physical functions PF_1, PF_2 and PF_3.

The storage system 10d may be substantially the same as the storage system 10c of FIG. 9, except that the storage system 10d further includes the second accelerator 220d and the bus 132 and the storage device 300d further includes the third physical function PF_3 and the third namespace 323.

The storage device 300d may be implemented with a single-port structure and a multi-physical function structure. The first port PT_1d may be similar to the first port PT_1c in FIG. 9. The one or more physical functions 350 may further include the third physical function PF_3 that is exposed through the first port PT_1d for communication with the second accelerator 220d.

The second accelerator 220d may be connected to the storage device 300d through the first port PT_1d, the host device 100 and the buses 110 and 132. The storage device 300d may be accessed by the second accelerator 220d using the buses 110 and 132, the host device 100, the first port PT_1d, the third physical function PF_3 and the buffer memory 330. The second accelerator 220d may be implemented to support a direct storage function in which the second accelerator 220d accesses the storage device 300d without using the buffer memory 150. For example, as illustrated in FIG. 13, the second accelerator 220d may exchange the third data DAT3 with the storage device 300d through the first port PT_1d using bus 132, the host device 100, the bus 110, the first port PT_1d, the third physical function PF_3, and the buffer memory 330.

In some example embodiments, as with the examples illustrated in FIGS. 11A and 11B, at least one of first performance by the first physical function PF_1, second performance by the second physical function PF_2 and third performance by the third physical function PF_3 may be dynamically and/or adaptively controlled based on a control of at least one of the host device 100, the first accelerator 210c and the second accelerator 220d.

In the examples of FIGS. 9 and 12, the storage devices 300c and 300d may be implemented with a multi-physical function scheme in which PCIe lanes between the storage devices 300c and 300d and the host device 100 are used, the single port PT_1c or PT_1d is used and the physical functions PF_1, PF_2 and PF_3 are separated from each other. In addition, the storage devices 300c and 300d may be implemented to support the CXL protocol. Therefore, the performance may be dynamically distributed for each of the physical functions based on the single port. However, the latency may increase due to a path between the host device 100 and the accelerator.

Figure 14:
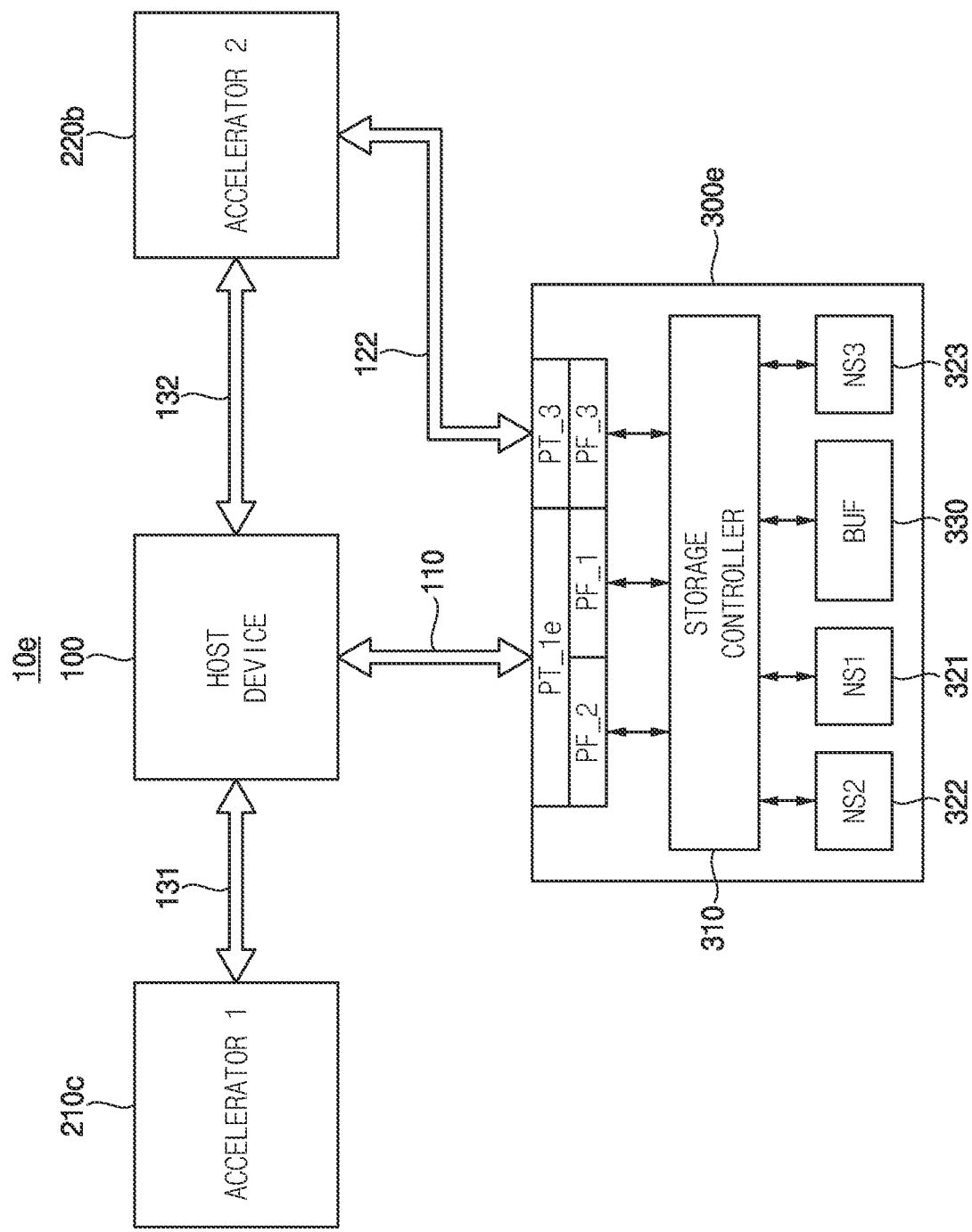
FIGS. 14 and 15 are block diagrams illustrating examples of a storage device and a storage system of FIG. 1.
Figure 15:
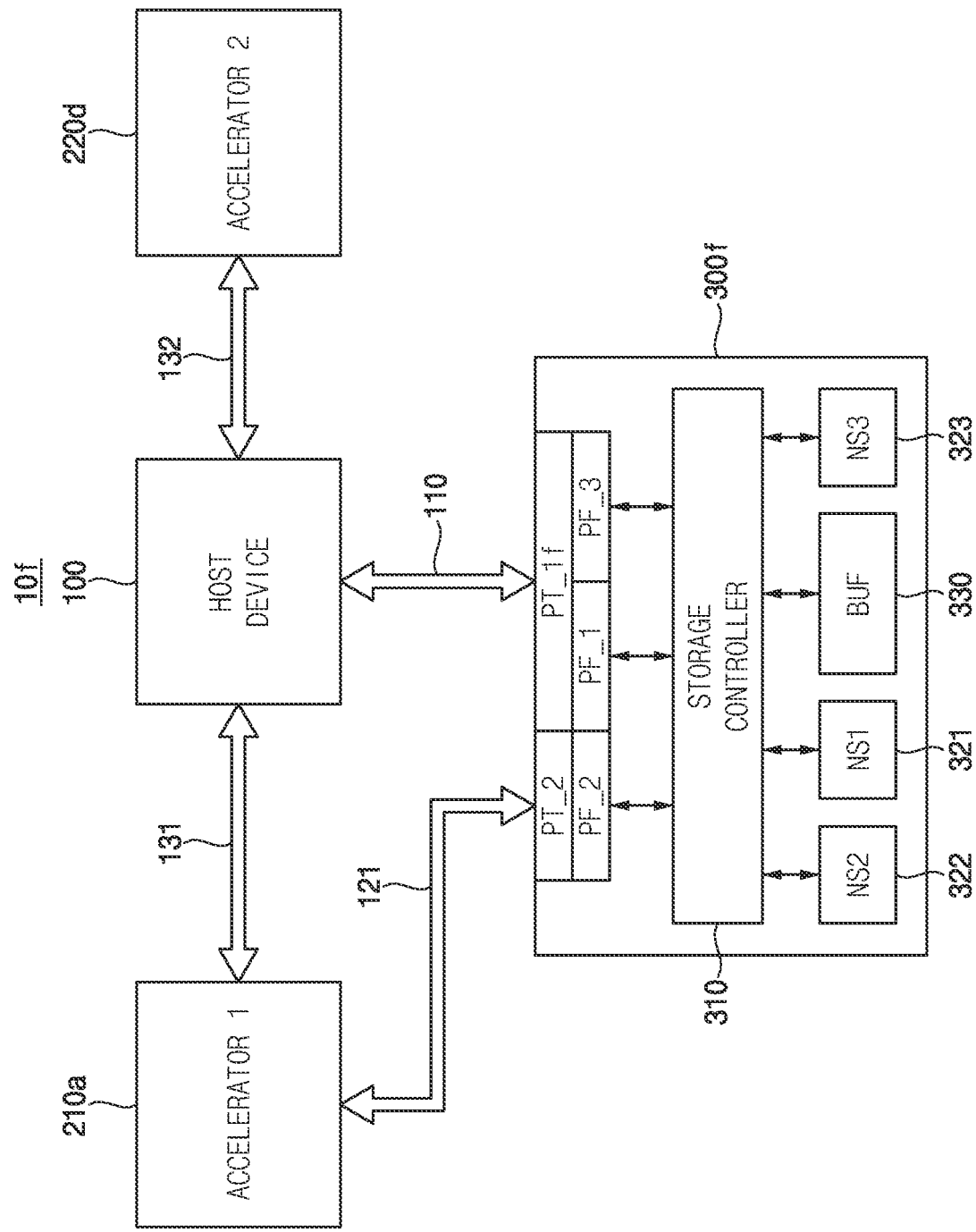

FIGS. 14 and 15 are block diagrams illustrating examples of a storage device and a storage system of FIG. 1. The descriptions repeated with FIGS. 5, 7, 9 and 12 will be omitted for conciseness.

Referring to FIG. 14, a storage system 10e may include a host device 100, a first accelerator 210c, a second accelerator 220b, a storage device 300e, and buses 110, 122, 131, and 132. The storage device 300e may include a storage controller 310, first, second and third namespaces 321, 322 and 323, a buffer memory 330, first and third ports PT_1e and PT_3, and first, second and third physical functions PF_1, PF_2 and PF_3. FIG. 14 illustrates an example in which a configuration related to the first accelerator 210c in FIG. 9 and a configuration related to the second accelerator 220b in FIG. 7 are combined.

Referring to FIG. 15, a storage system 10f may include a host device 100, a first accelerator 210a, a second accelerator 220d, a storage device 300f, and buses 110, 121, 131 and 132. The storage device 300f may include a storage controller 310, first, second and third namespaces 321, 322 and 323, a buffer memory 330, first and second ports PT_1f and PT_2, and first, second and third physical functions PF_1, PF_2 and PF_3. FIG. 15 illustrates an example in which a configuration related to the first accelerator 210a in FIG. 5 and a configuration related to the second accelerator 220d in FIG. 12 are combined.

In the examples described with reference to FIGS. 1 through 15, the direct storage function may be implemented by directly allocating or assigning the PCIe DMA of the accelerator to the buffer memory 330 inside the storage device.

Figure 16:
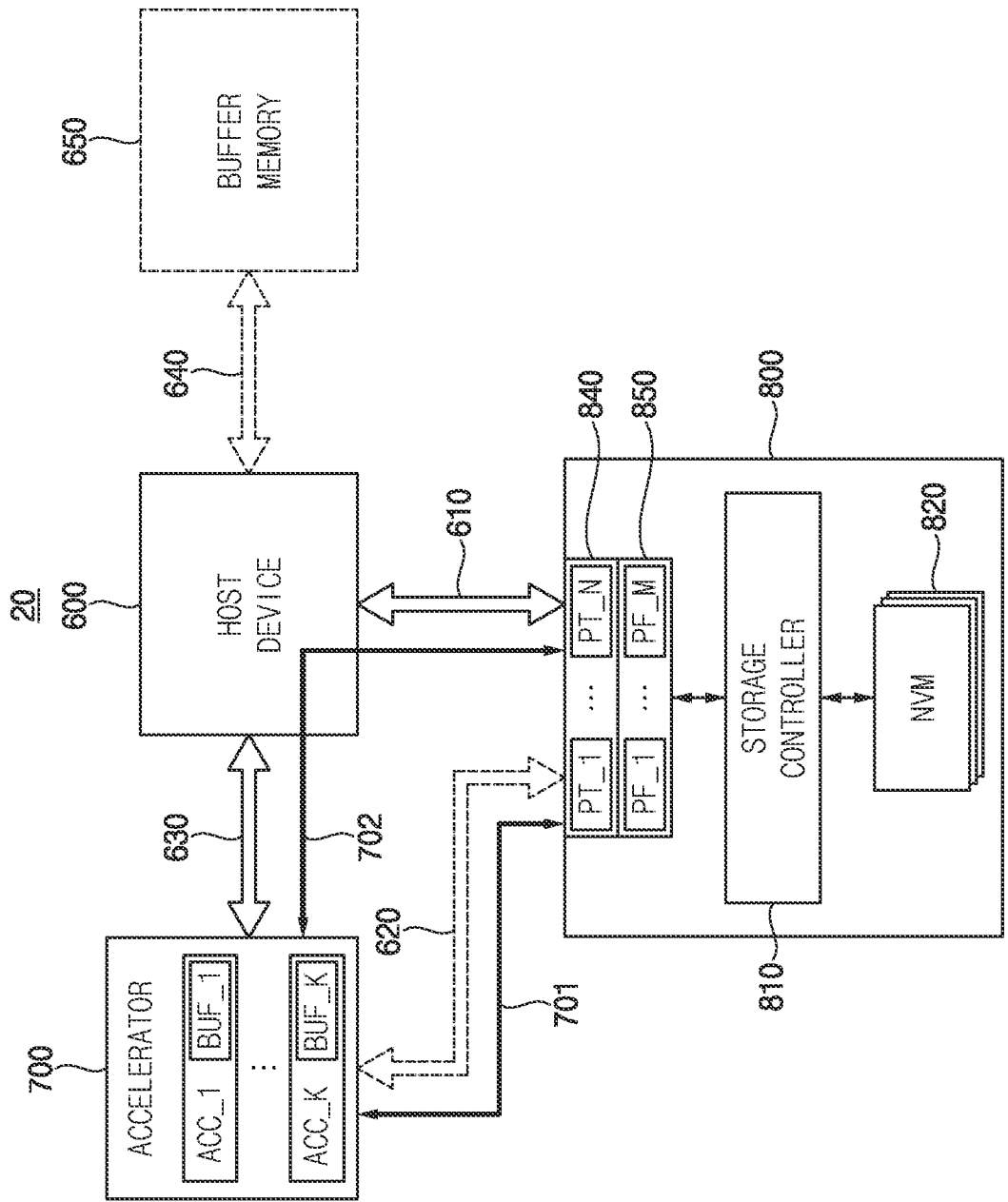
FIG. 16 is a block diagram illustrating a storage device and a storage system including the storage device according to some example embodiments.

FIG. 16 is a block diagram illustrating a storage device and a storage system including the storage device according to some example embodiments. The descriptions repeated with FIG. 1 will be omitted for conciseness.

Referring to FIG. 16, a storage system 20 includes a host device 600, one or more accelerators 700, and a storage device 800. The storage system 20 may further include buses 610, 620, 630 and 640, and a buffer memory 650. The one or more accelerators 700 may include first to K-th accelerators ACC_1 to ACC_K, and each of the first to K-th accelerators ACC_1 to ACC_K may include a respective one of buffer memories BUF_1, . . . , BUF_K. The storage device 800 includes a storage controller 810, a plurality of nonvolatile memories 820, a buffer memory 830, one or more ports 840, and one or more physical functions 850.

The storage system 20 may be substantially the same as the storage system 10 of FIG. 1, except that each accelerator includes the buffer memory, the buffer memory included in the storage device 800 is omitted, and the direct storage function is implemented using the buffer memory included in each accelerator. However, this configuration does not necessarily mean that the storage device 800 does not actually and/or physically include the buffer memory. But rather, this configuration may mean merely that the buffer memory in the storage device 800 is unnecessary for the direct storage function or does not operate with respect to the direct storage function.

In the storage system 20 according to some example embodiments, the one or more accelerators 700 are implemented to support a direct storage function in which the one or more accelerators 700 accesses the storage device 800 without using the buffer memory 650. For example, when the storage device 800 is accessed by the one or more accelerators 700, at least one of the buffer memories BUF_1 to BUF_K inside the accelerator 700 may be used as a buffer memory for the one or more accelerators 700 and the storage system 20 by the one or more ports 840 and the one or more physical functions 850. For example, the one or more accelerators 700 may exchange data with the storage device 800 using the one or more ports 840 and the one or more physical functions 850 that are included in the storage device 800, and using at least one of the buffer memories BUF_1 to BUF_K inside the accelerator 700, without using (or passing through) the buffer memory 150 that is the system buffer memory. The buffer memories BUF_1 to BUF_K may be referred to as accelerator buffer memories.

In some example embodiments, as will be described with reference to FIG. 18, when the one or more accelerators 700 are directly connected to the storage device 800, the above-described direct storage function may be implemented through a first path 701 including the bus 620. In some example embodiments, as will be described with reference to FIG. 22, when the one or more accelerators 700 are not directly connected to the storage device 800, the above-described direct storage function may be implemented through a second path 702 including the bus 630, the host device 600, and the bus 610.

In some example embodiments, to support the above-described direct storage function, the storage system 20 may operate based on compute express link (CXL). For example, in some example embodiments, the storage system 20 may be a CXL storage system supporting the CXL protocol. However, in some example embodiments, unlike the example of FIG. 1, the storage device 800 may not be a CXL storage device supporting CXL. That is, the storage system 20 may be a CXL storage system but may be using a non-CXL storage device 800. For example, when the CXL protocol is applied or employed, the host device 600 and the one or more accelerators 700 may use the buffer memories BUF_1 to BUF_K in the one or more accelerators 700 as external buffer memories, and may directly access the buffer memories BUF_1 to BUF_K via a DMA according to the CXL protocol. Thus, the storage system 20 may implement a direct access function using the CXL protocol even when the storage device 800 is a non-CXL storage device that does not support the CXL protocol.

The storage system 20 according to some example embodiments may include the storage device 800 that is implemented with a multi-port structure including the one or more ports 840 and/or a multi-physical function structure including the one or more physical functions 850. For example, in some example embodiments, the storage device 800 may operation based on the CXL protocol. That is, in some example embodiments, the storage system 20 may implement a multi-port structure using a CXL protocol with a storage device 800 that supports the CXL protocol. The one or more accelerators 700 may be directly connected to the storage device 800 based on the multi-port structure of the storage device 800, or may directly exchange data with the storage device 800 using the buffer memories BUF_1 to BUF_K inside the one or more accelerators 700 based on the multi-physical function structure of the storage device 800. Accordingly, the direct storage function in which the storage device 800 is accessed without using the buffer memory 650 may be efficiently implemented. In other words, because the one or more accelerators 700 has buffer memories BUF_1 to BUF_K, it does not matter whether the storage device 800 supports the CXL protocol or not; rather, regardless of the CXL protocol support of the storage device 800, the storage system 20 may still implement the multi-port structure to directly exchange data between the one or more accelerators 700 and the storage device 800.

Figure 17:
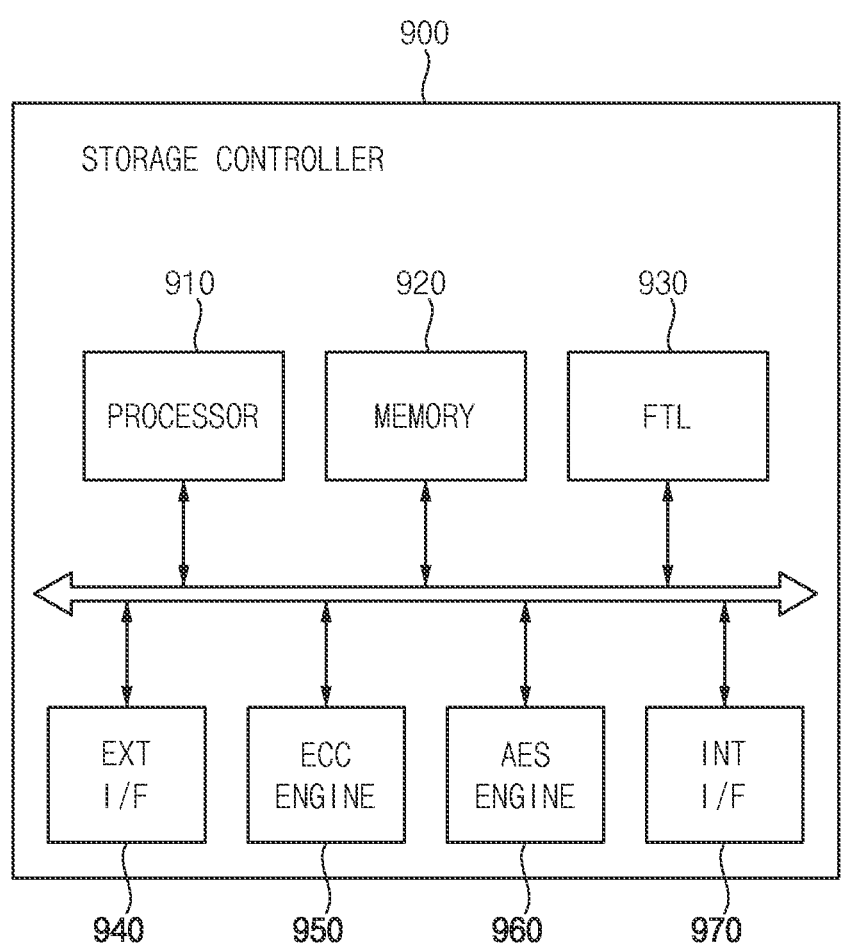
FIG. 17 is a block diagram illustrating an example of a storage controller included in a storage device according to some example embodiments.

FIG. 17 is a block diagram illustrating an example of a storage controller included in a storage device according to some example embodiments. The descriptions repeated with FIG. 2 will be omitted for conciseness.

Referring to FIG. 17, a storage controller 900 may include a processor 910, a memory 920, a FTL 930, an external interface 940, an ECC engine 950, an AES engine 960 and an internal interface 970. For example, the storage controller 900 may correspond to the storage controller 810 in FIG. 16.

The storage controller 900 may be substantially the same as the storage controller 400 of FIG. 2, except that the CXL interface (CXL I/F) 441 is omitted in the external interface 940.

Figure 18:
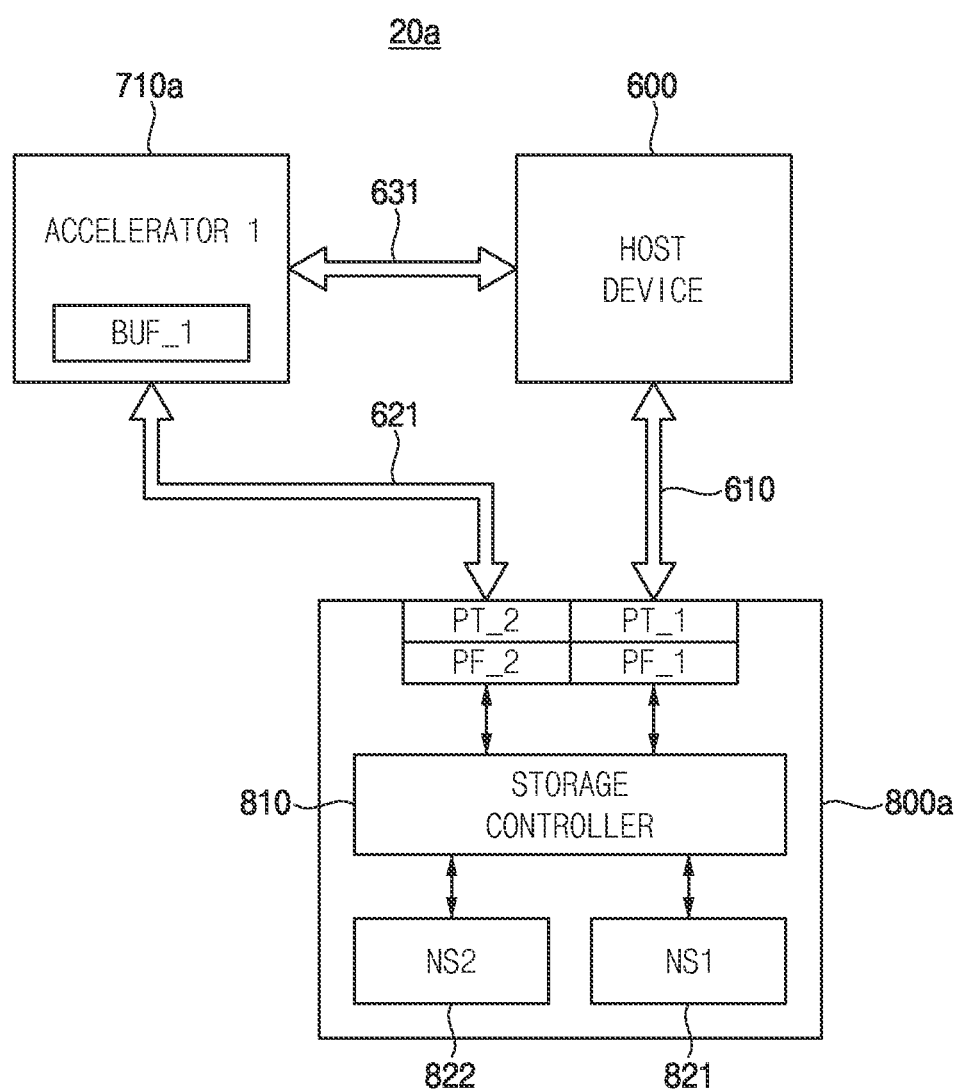
FIG. 18 is a block diagram illustrating an example of a storage device and a storage system of FIG. 16.
Figure 19A:
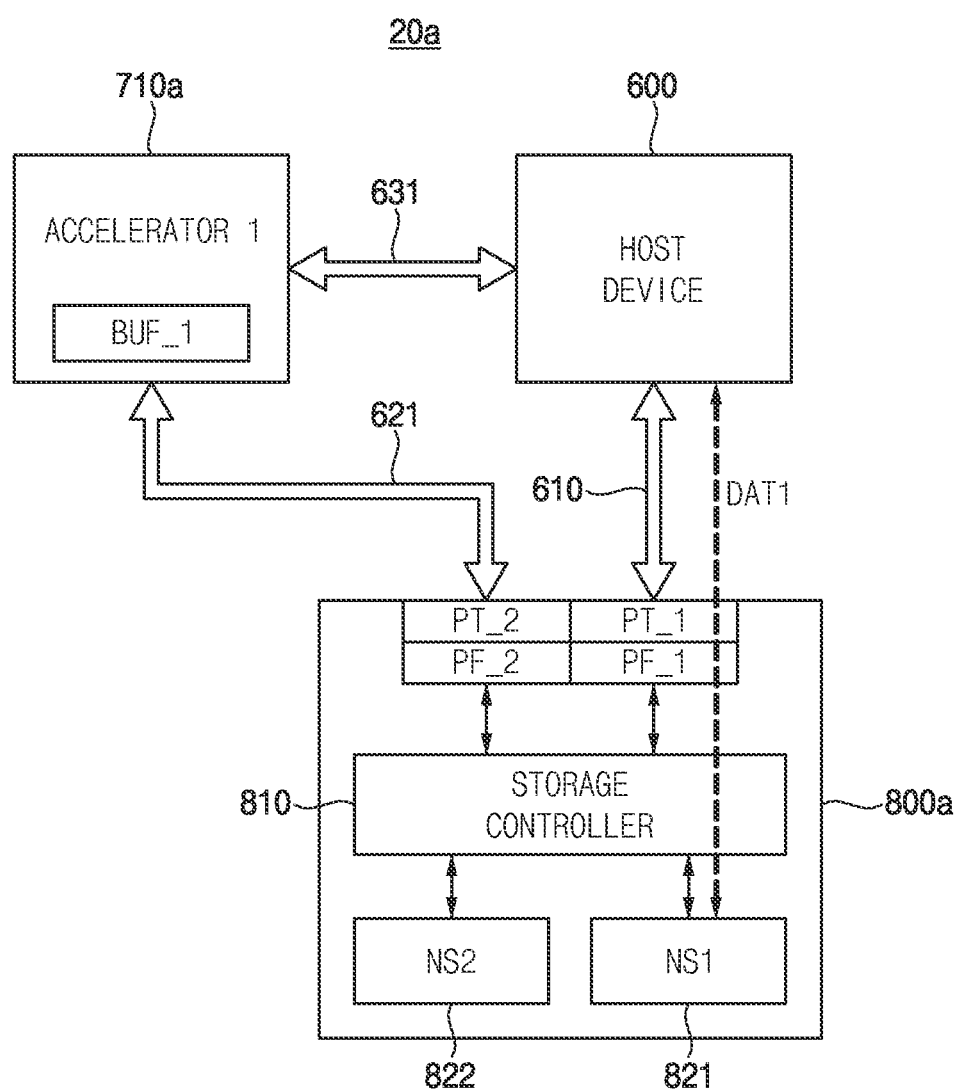
FIGS. 19A and 19B are diagrams for describing operations of a storage device and a storage system of FIG. 18.
Figure 19B:
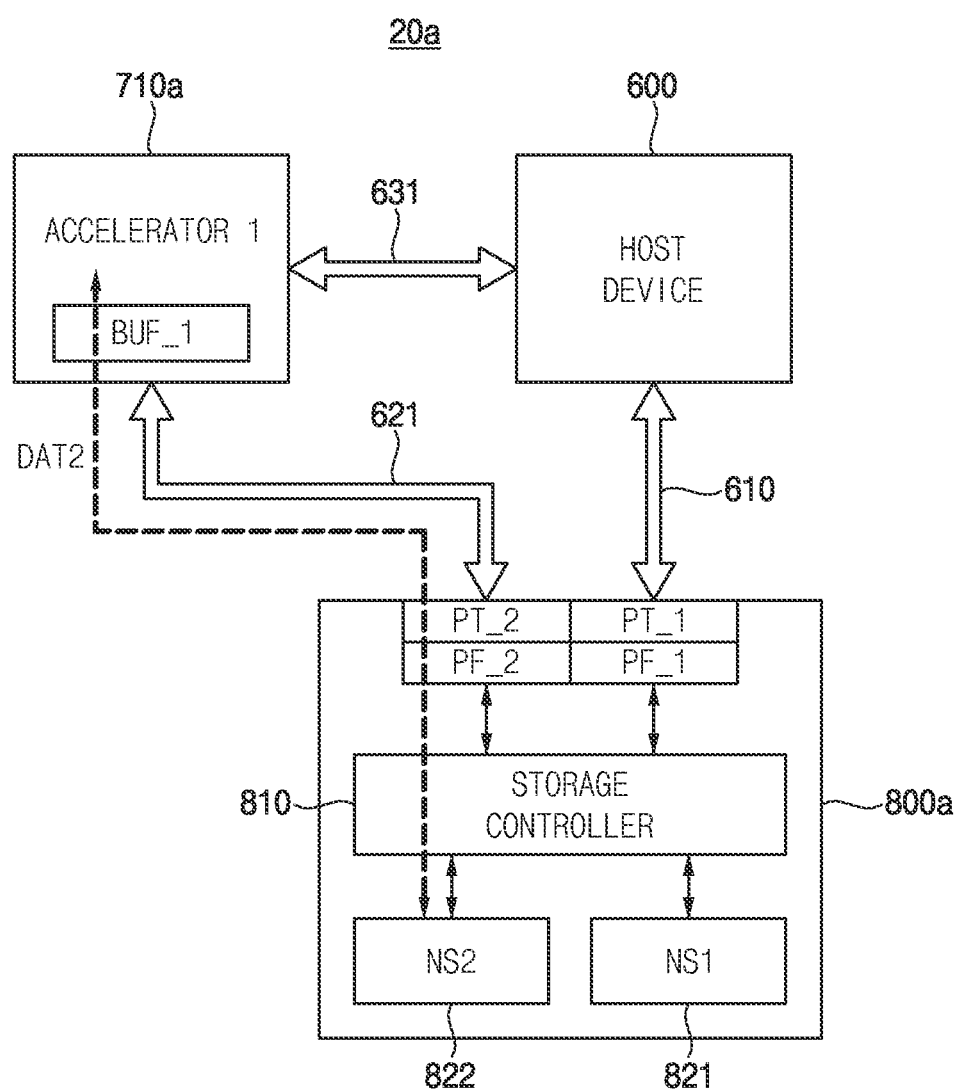

FIG. 18 is a block diagram illustrating an example of a storage device and a storage system of FIG. 16. FIGS. 19A and 19B are diagrams for describing operations of a storage device and a storage system of FIG. 18. The descriptions repeated with FIGS. 5, 6A and 6B will be omitted for conciseness.

Referring to FIGS. 18, 19A and 19B, a storage system 20*a* may include a host device 600, a first accelerator 710*a*, a storage device 800*a*, and buses 610, 621 and 631. The first accelerator 710*a* may include a first buffer memory BUF_1. The storage device 800*a* may include a storage controller 810, first and second namespaces 821 and 822, first and second ports PT_1 and PT_2, and first and second physical functions PF_1 and PF_2.

The host device 600 may be directly connected to the storage device 800*a* through the first port PT_1 and the bus 610. Although not illustrated in detail, the host device 600 may include a port corresponding to the first port PT_1.

The storage device 800*a* may be accessed by the host device 600 using the bus 610, the first port PT_1, and the first physical function PF_1. For example, as illustrated in FIG. 19A, when first data DAT1 is to be written into the first namespace 821 or is to be read from the first namespace 821, the host device 600 may directly exchange the first data DAT1 with the storage device 800*a* through the first port PT_1 using the bus 610, the first port PT_1, and the first physical function PF_1.

The first accelerator 710*a* may be directly connected to the storage device 800*a* through the second port PT_2 and the bus 621. Although not illustrated in detail, the first accelerator 710*a* may include a port corresponding to the second port PT_2.

The storage device 800*a* may be accessed by the first accelerator 710*a* using the first buffer BUF_1, the bus 621, the second port PT_2, and the second physical function PF_2. The first accelerator 710*a* may be implemented to support a direct storage function in which the first accelerator 710*a* accesses the storage device 800*a* without using the buffer memory 150. For example, as illustrated in FIG. 19B, when second data DAT2 is to be written into the second namespace 822 or is to be read from the second namespace 822, the first accelerator 710*a* may directly exchange the second data DAT2 with the storage device 800*a* through the second port PT_2 using the first buffer BUF_1, the bus 621, the second port PT_2, and the second physical function PF_2.

Figure 20:
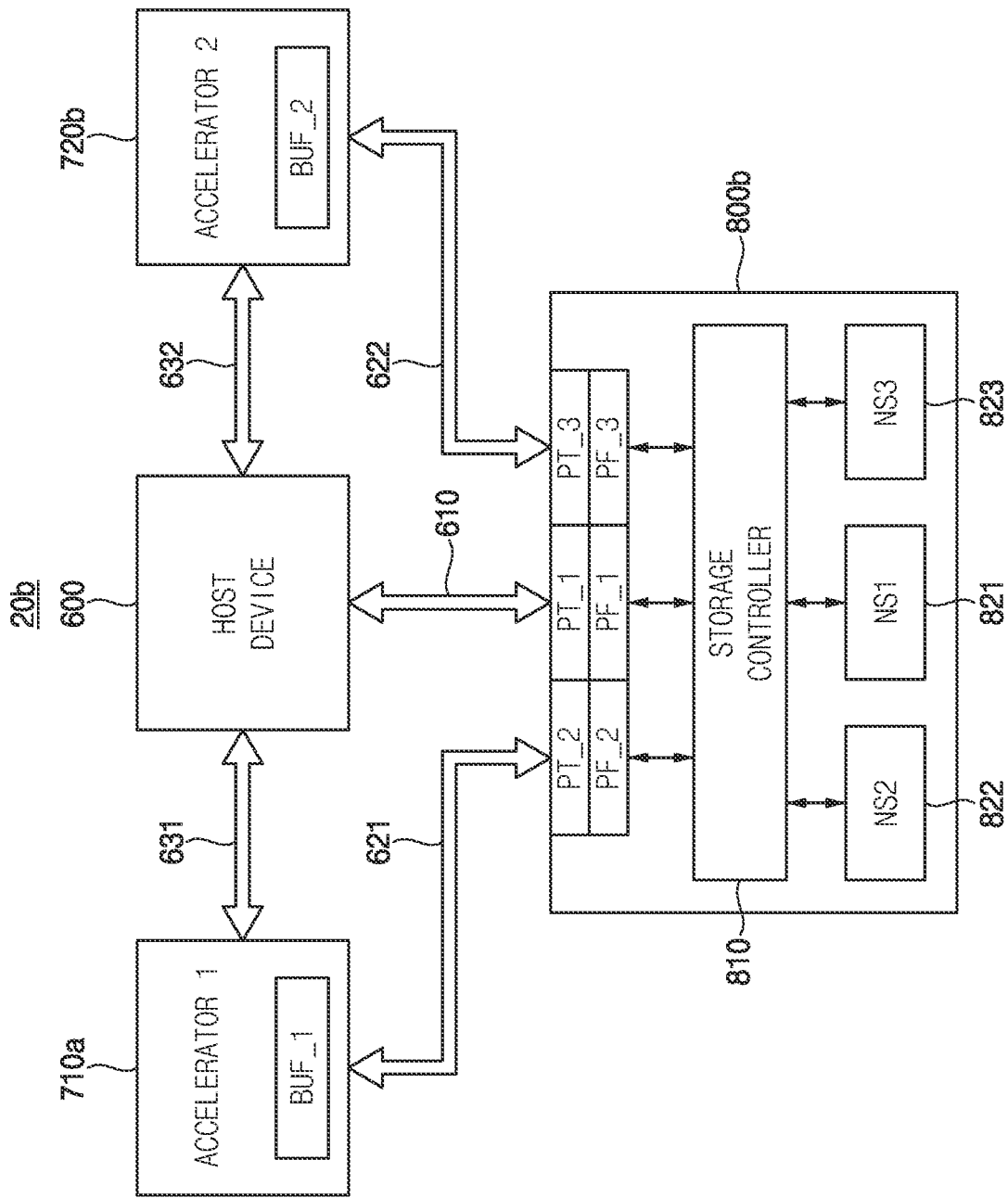
FIG. 20 is a block diagram illustrating an example of a storage device and a storage system of FIG. 16.
Figure 21:
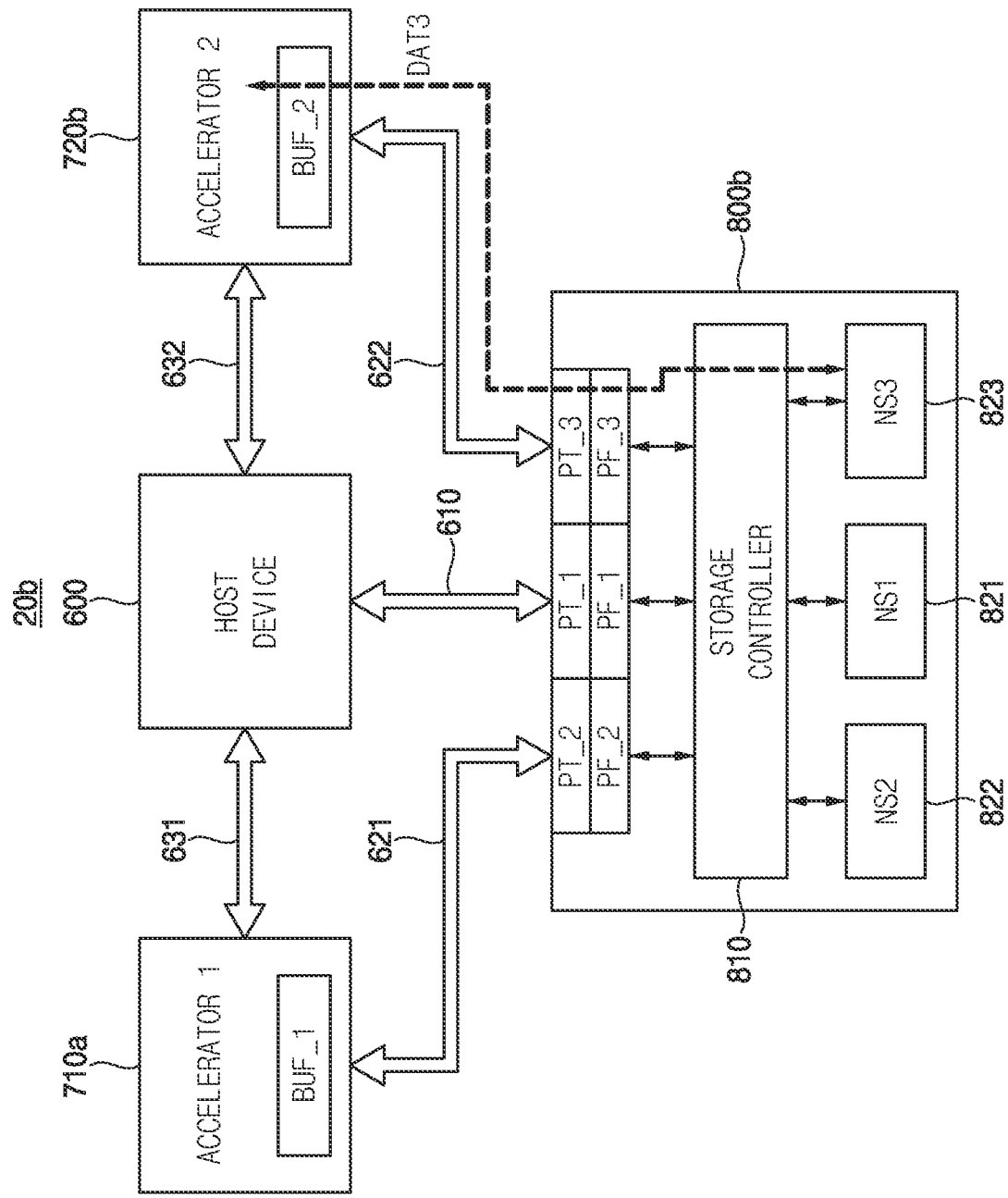
FIG. 21 is a diagram for describing operations of a storage device and a storage system of FIG. 20.

FIG. 20 is a block diagram illustrating an example of a storage device and a storage system of FIG. 16. FIG. 21 is a diagram for describing operations of a storage device and a storage system of FIG. 20. The descriptions repeated with FIGS. 7, 8, 18, 19A and 19B will be omitted for conciseness.

Referring to FIGS. 20 and 21, a storage system 20b may include a host device 600, a first accelerator 710a, a second accelerator 720b, a storage device 800b, and buses 610, 621, 622, 631 and 632. The first accelerator 710a may include a first buffer memory BUF_1, and the second accelerator 720b may include a second buffer memory BUF_2. The storage device 800b may include a storage controller 810, first, second and third namespaces 821, 82, and 823, first, second and third ports PT_1, PT_2 and PT_3, and first, second and third physical functions PF_1, PF_2 and PF_3.

The second accelerator 720b may be connected to the host device 600 through the bus 632, and may be directly connected to the storage device 800b through the third port PT_3 and the bus 622. The storage device 800b may be accessed by the second accelerator 720b using the second buffer BUF_2, the bus 622, the third port PT_3, and the third physical function PF_3. The second accelerator 720b may be implemented to support a direct storage function in which the second accelerator 720b accesses the storage device 800b without using the buffer memory 150. For example, as illustrated in FIG. 21, when third data DAT3 is to be written into the third namespace 823 or is to be read from the third namespace 823, the second accelerator 720b may directly exchange the third data DAT3 with the storage device 800b through the third port PT_3 using the second buffer BUF_2, the bus 622, the third port PT_3, and the third physical function PF_3.

Figure 22:
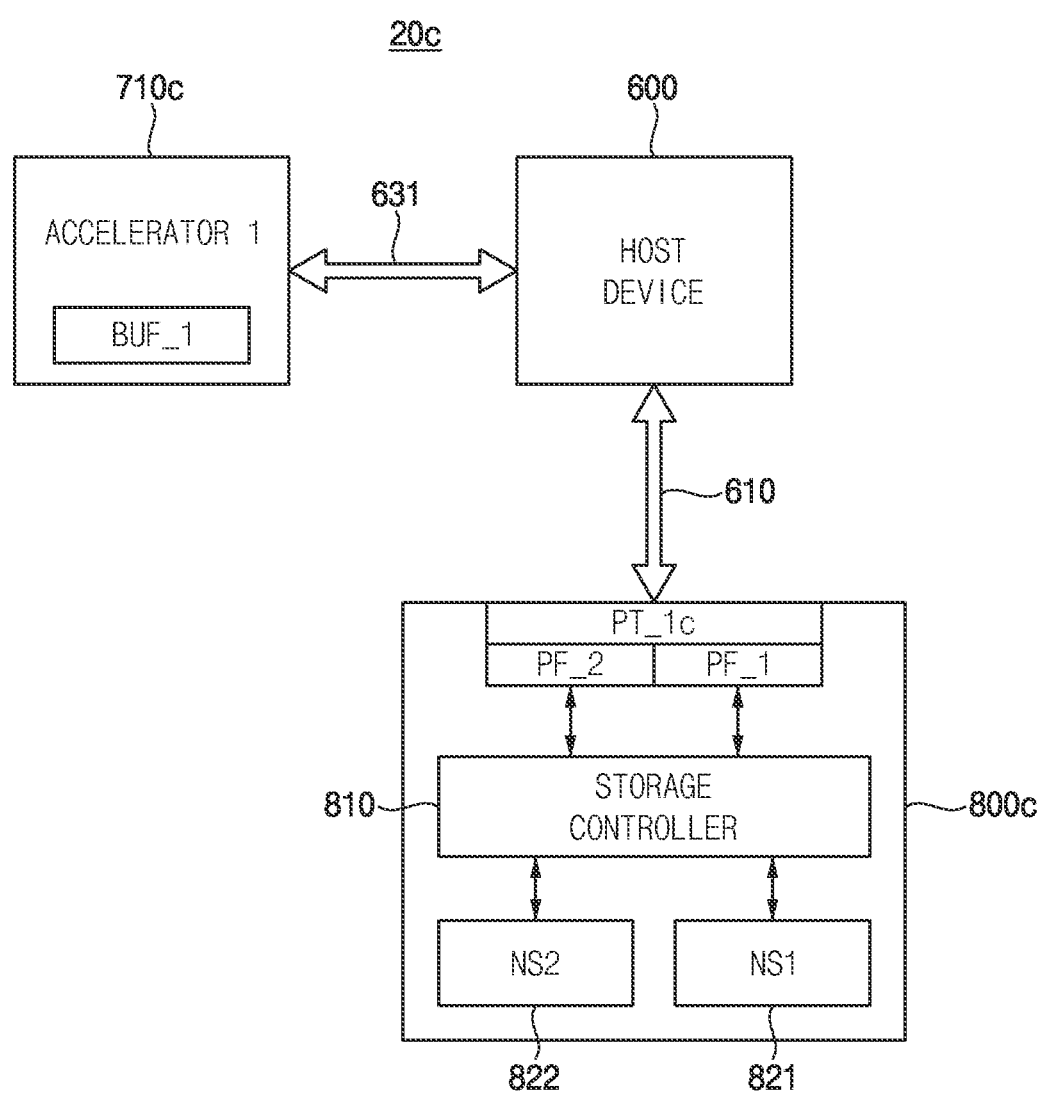
FIG. 22 is a block diagram illustrating an example of a storage device and a storage system of FIG. 16.

FIG. 22 is a block diagram illustrating an example of a storage device and a storage system of FIG. 16. FIGS. 23A, 23B, 24A and 24B are diagrams for describing operations of a storage device and a storage system of FIG. 22. The descriptions repeated with FIGS. 9, 10A, 10B, 11A, 11B, 18, 19A and 19B will be omitted for conciseness.

Referring to FIGS. 22, 23A, 23B, 24A and 24B, a storage system 20c may include a host device 600, a first accelerator 710c, a storage device 800c, and buses 610 and 631. The first accelerator 710c may include a first buffer memory BUF_1. The storage device 800c may include a storage controller 810, first and second namespaces 821 and 822, a first port PT_1c, and first and second physical functions PF_1 and PF_2.

Figure 23A:
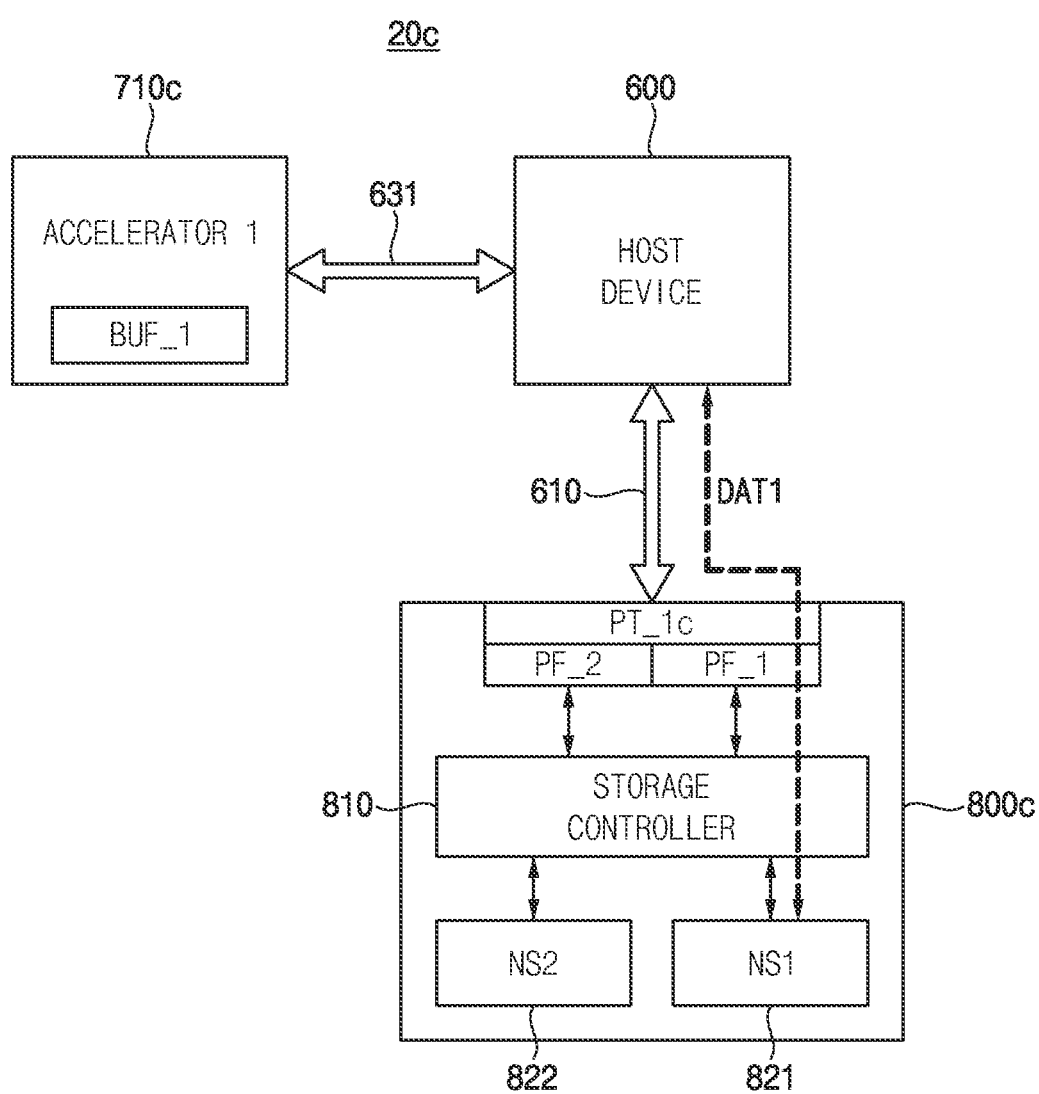
FIGS. 23A, 23B, 24A and 24B are diagrams for describing operations of a storage device and a storage system of FIG. 22.

The host device 600 may be directly connected to the storage device 800c through the first port PT_1c and the bus 610. As illustrated in FIG. 23A, the host device 600 may directly exchange the first data DAT1 with the storage device 800c through the first port PT_1c using the bus 610, the first port PT_1c, and the first physical function PF_1.

Figure 23B:
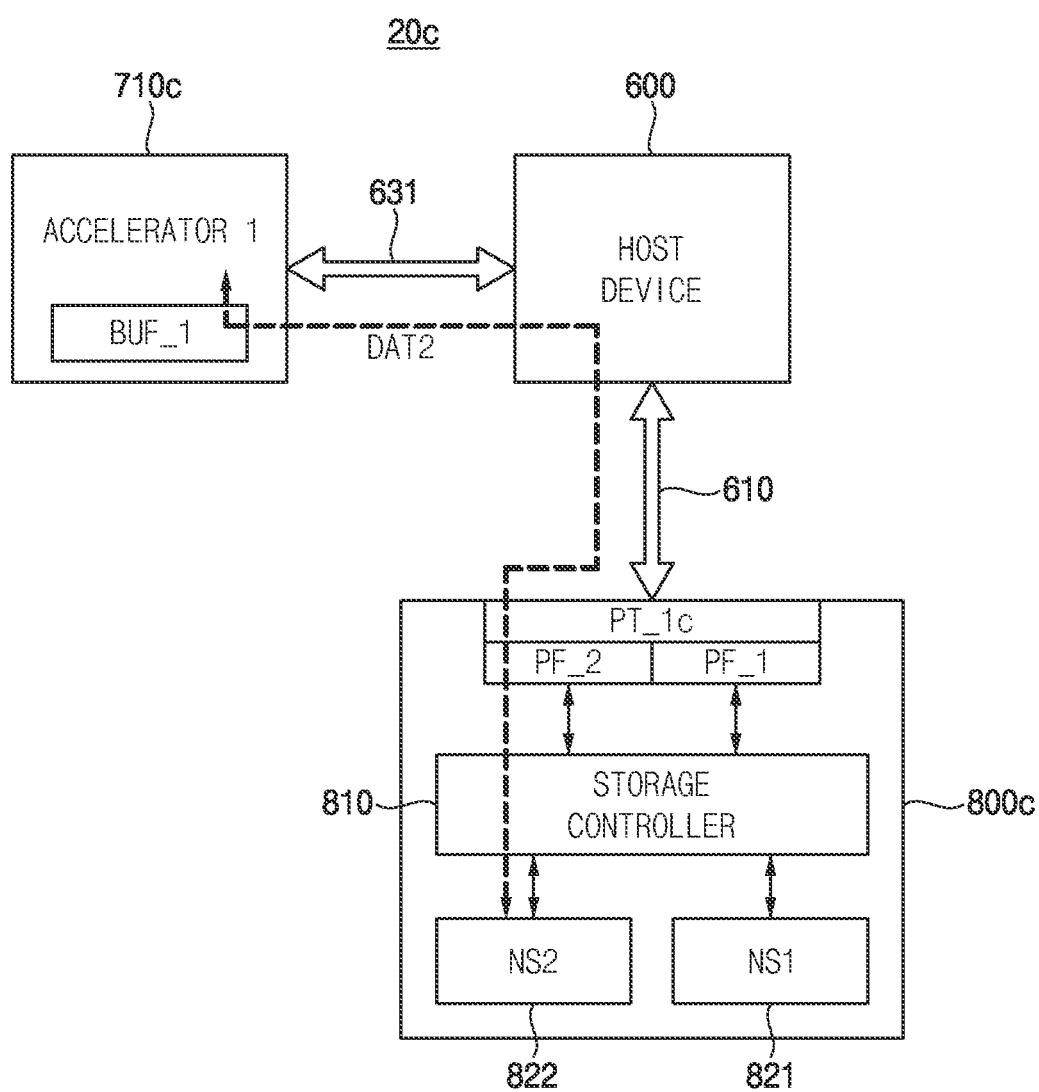

The first accelerator 710c may be connected to the storage device 800c through the first port PT_1c, the host device 600 and the buses 610 and 631. The storage device 800c may be accessed by the first accelerator 710c through the first port PT_1c using the first buffer BUF_1, the bus 631, the host device 600, the bus 610, the first port PT_1c, and the second physical function PF_2. The first accelerator 710c may be implemented to support the direct storage function in which the first accelerator 710c accesses the storage device 800c without using the buffer memory 150. For example, as illustrated in FIG. 23B, the first accelerator 710c may exchange the second data DAT2 with the storage device 800c through the first port PT_1c using the first buffer BUF_1, the bus 631, the host device 600, the bus 610, the first port PT_1c, and the second physical function PF_2.

Figure 24A:
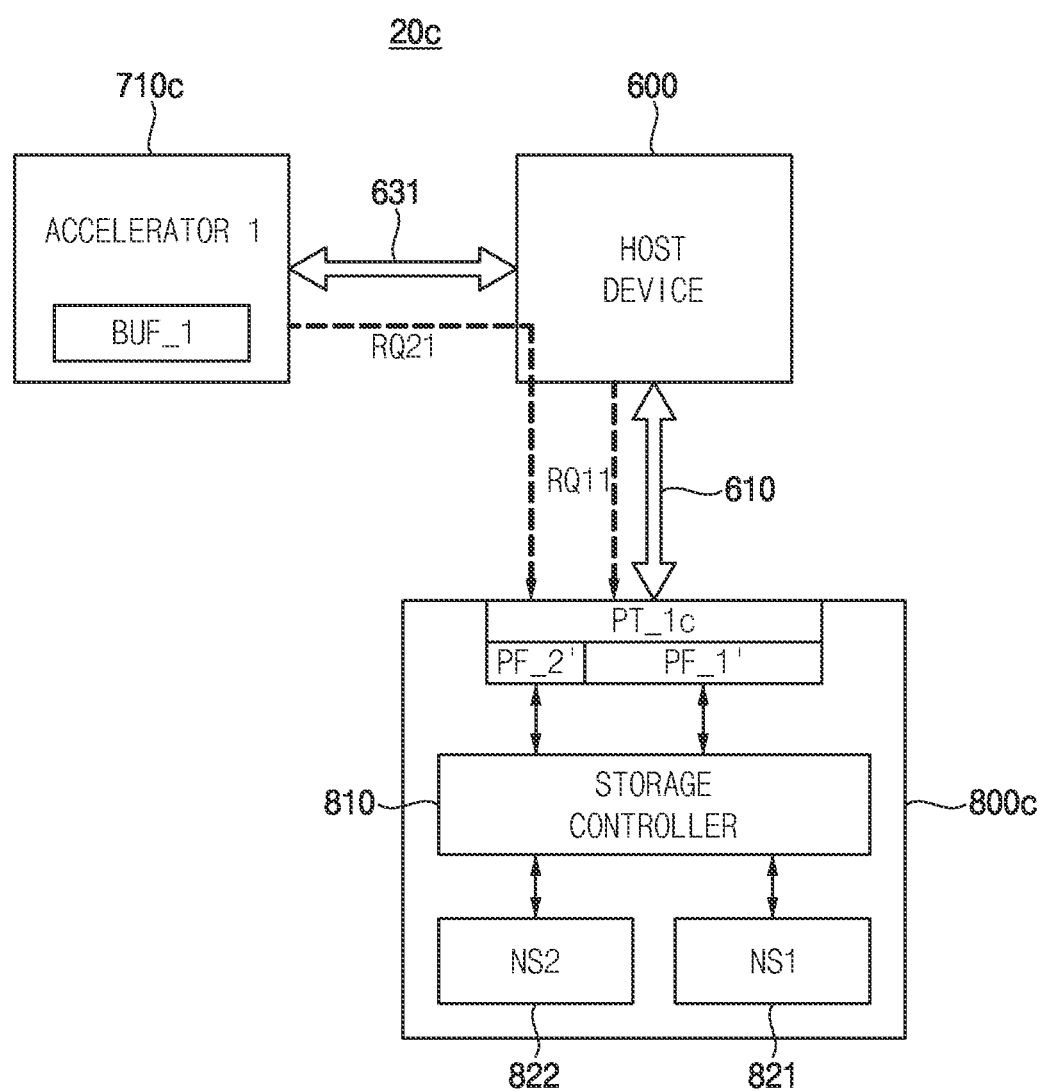
Figure 24B:
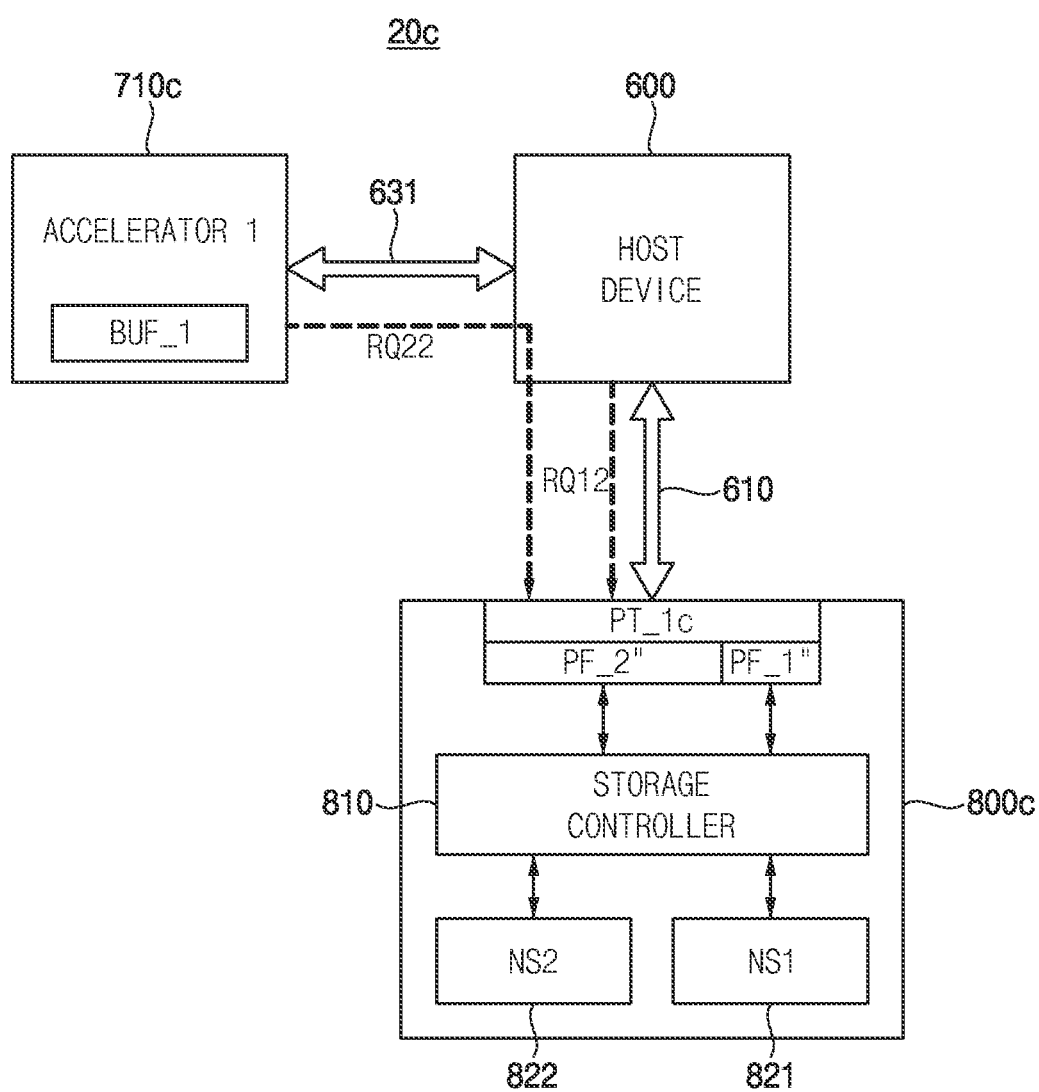

In some example embodiments, as illustrated in FIGS. 24A and 24B, first performance by the first physical function PF_1 and second performance by the second physical function PF_2 may be dynamically and/or adaptively controlled or adjusted based on or under a control of at least one of the host device 600 and the first accelerator 710c similar to the manner illustrated in FIGS. 11A-11B and repeated description is omitted for conciseness.

Figure 25:
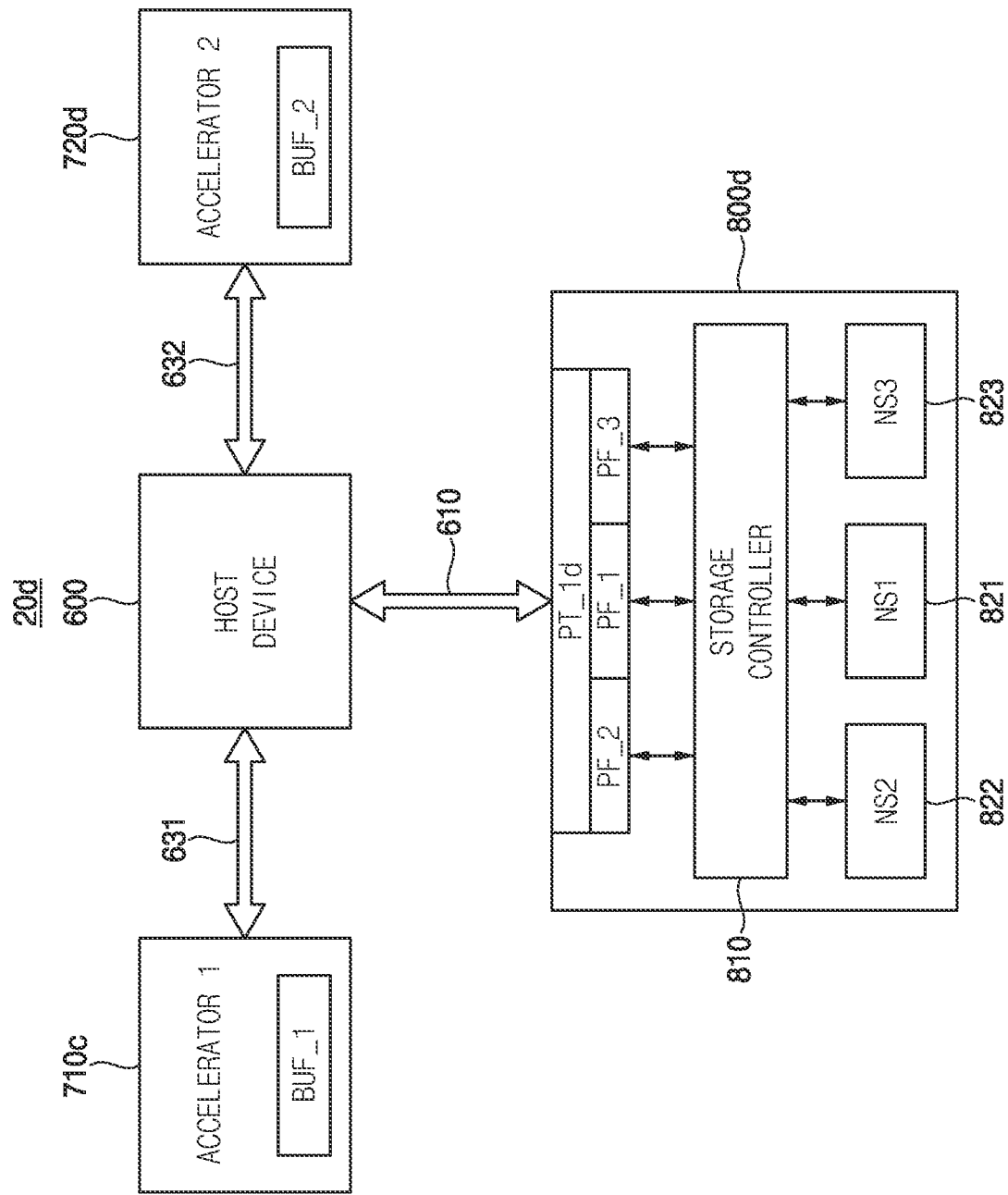
FIG. 25 is a block diagram illustrating an example of a storage device and a storage system of FIG. 16.
Figure 26:
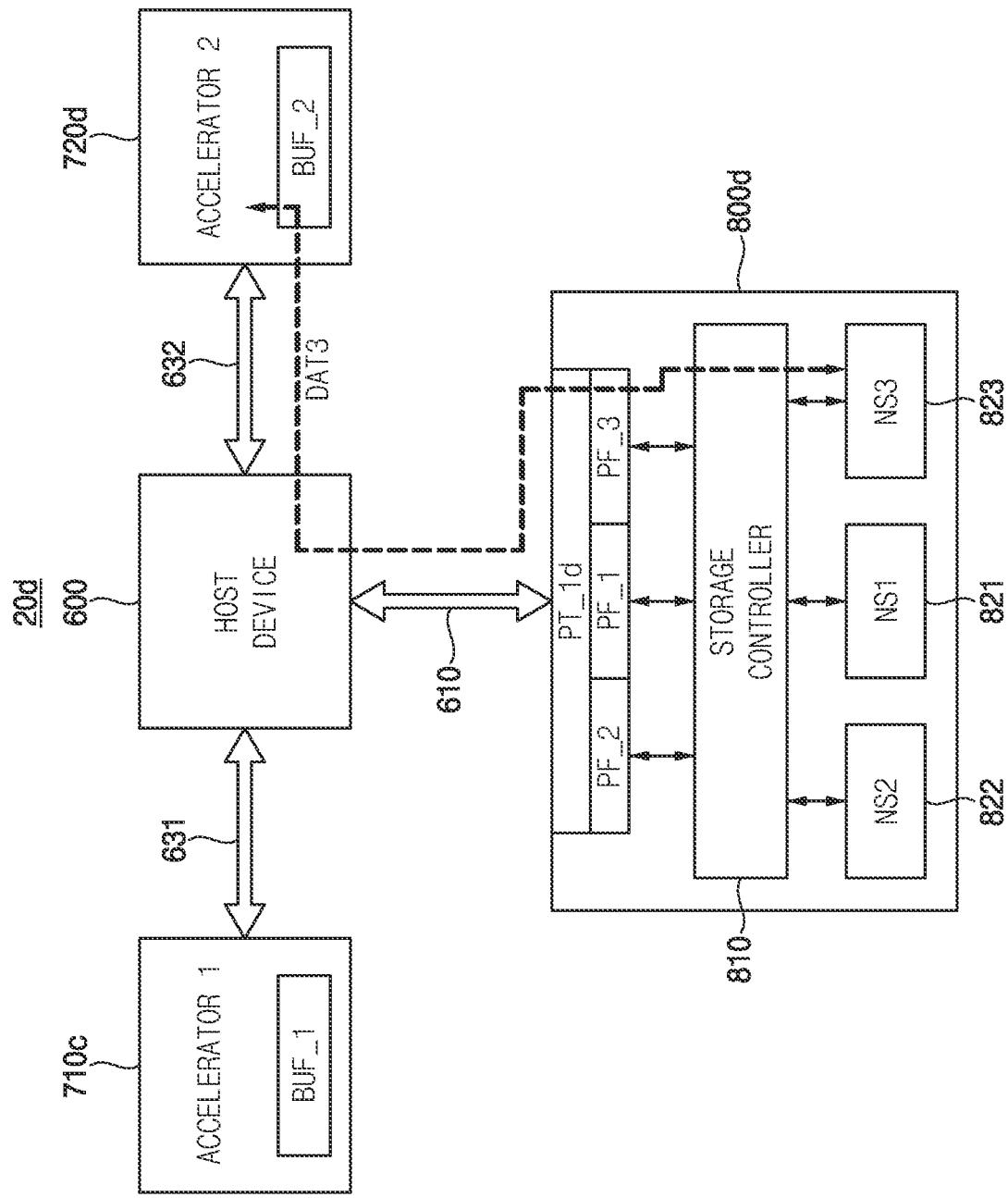
FIG. 26 is a diagram for describing operations of a storage device and a storage system of FIG. 25.

FIG. 25 is a block diagram illustrating an example of a storage device and a storage system of FIG. 16. FIG. 26 is a diagram for describing operations of a storage device and a storage system of FIG. 25. The descriptions repeated with FIGS. 12, 13, 20, 21, 22, 23A, 23B, 24A and 24B will be omitted for conciseness.

Referring to FIGS. 25 and 26, a storage system 20d may include a host device 600, a first accelerator 710c, a second accelerator 720d, a storage device 800d, and buses 610, 631 and 632. The first accelerator 710c may include a first buffer memory BUF_1, and the second accelerator 720d may include a second buffer memory BUF_2. The storage device 800d may include a storage controller 810, first, second and third namespaces 821, 822 and 823, a first port PT_1d, and first, second and third physical functions PF_1, PF_2 and PF_3.

The second accelerator 720d may be connected to the storage device 800d through the first port PT_1d, the host device 600 and the buses 610 and 632. The storage device 800d may be accessed by the second accelerator 720d using the second buffer BUF_2, the buses 610 and 632, the host device 600, the first port PT_1d, and the third physical function PF 3. The second accelerator 720d may be implemented to support a direct storage function in which the second accelerator 720d accesses the storage device 800d without using the buffer memory 150. For example, as illustrated in FIG. 26, the second accelerator 720d may exchange the third data DAT3 with the storage device 800d through the first port PT_1d using the second buffer BUF_2, the bus 632, the host device 600, the bus 610, the first port PT_1d, and the third physical function PF_3.

Figure 27:
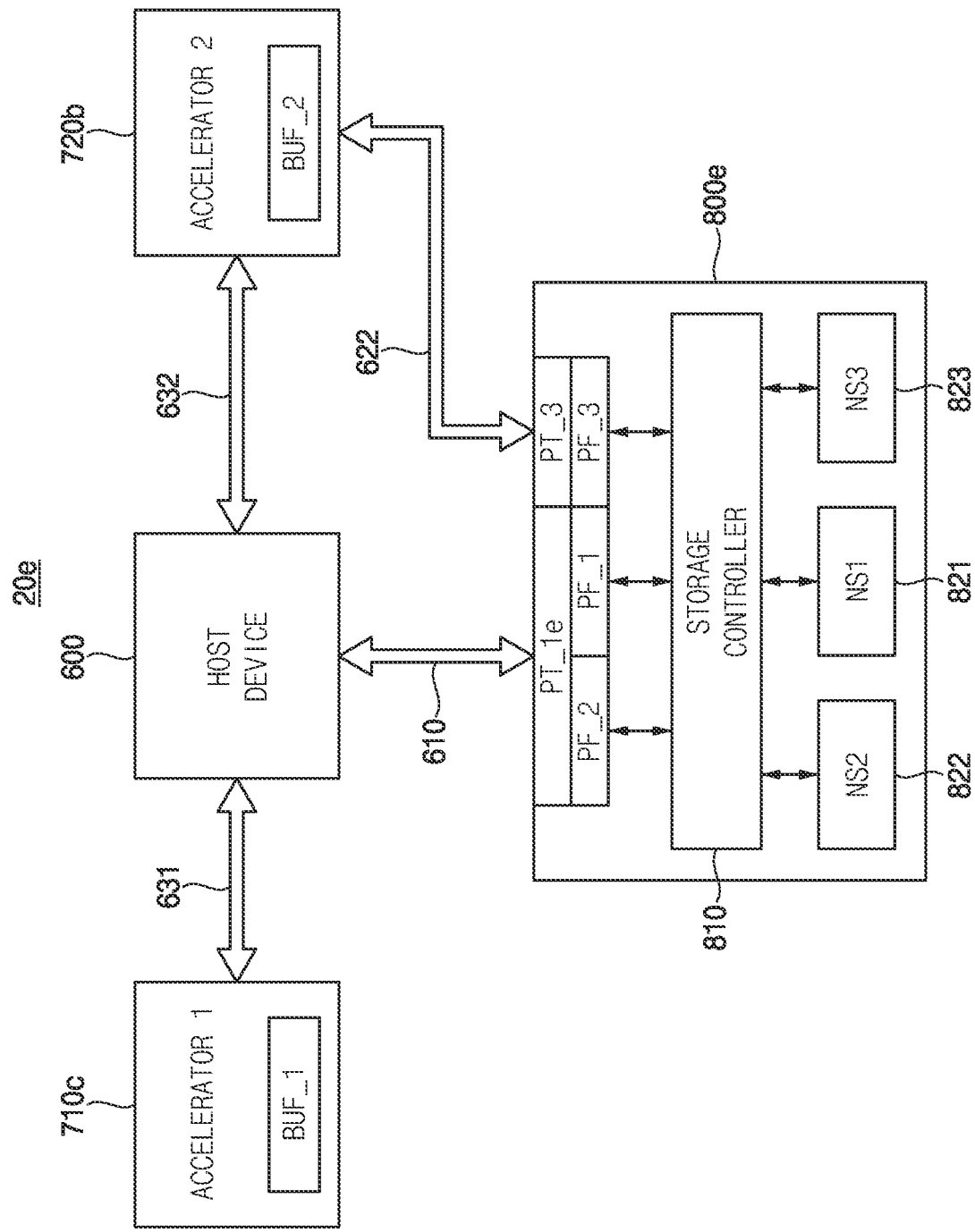
FIGS. 27 and 28 are block diagrams illustrating examples of a storage device and a storage system of FIG. 16.
Figure 28:
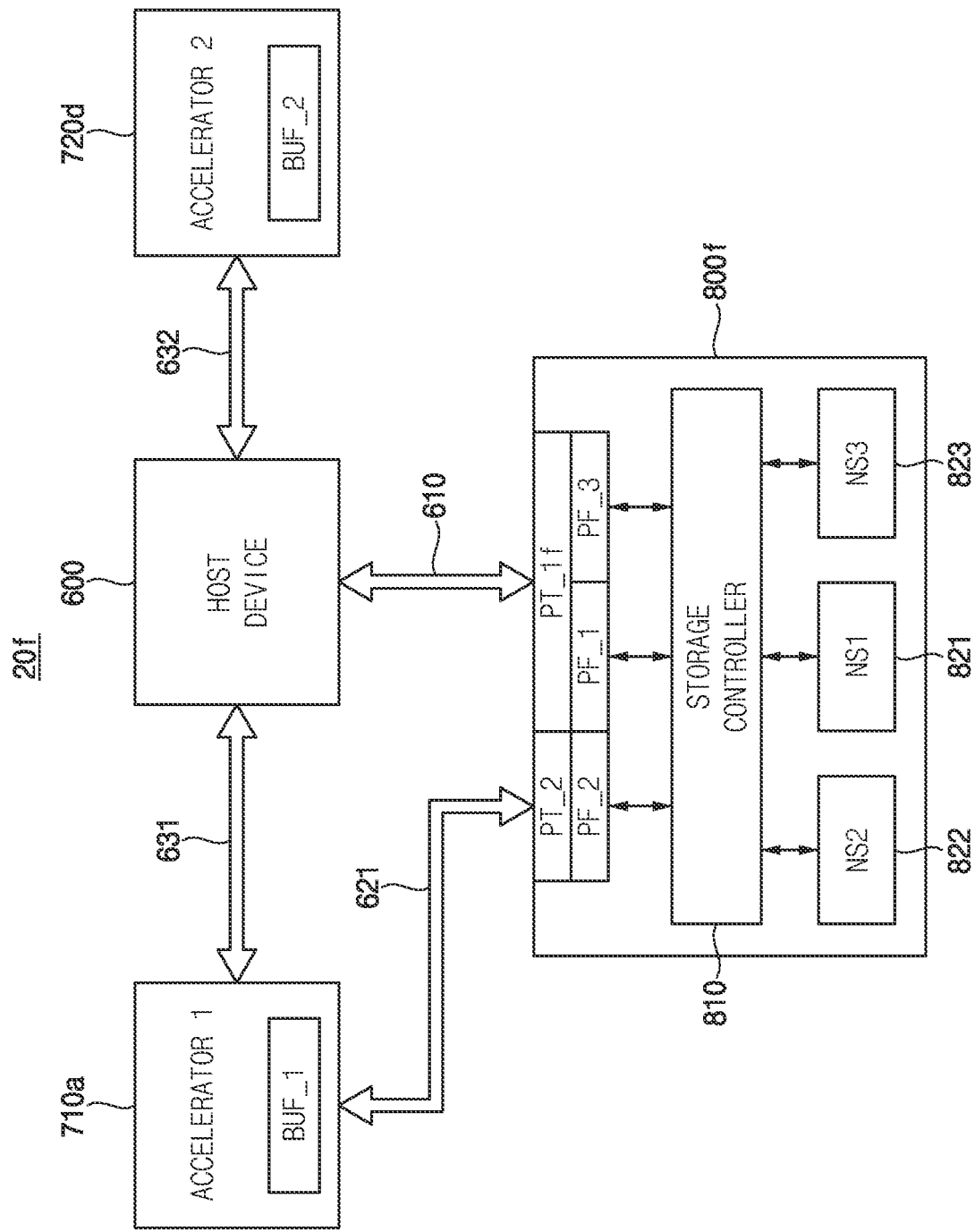

FIGS. 27 and 28 are block diagrams illustrating examples of a storage device and a storage system of FIG. 16. The descriptions repeated with FIGS. 14, 15, 18, 20, 22 and 25 will be omitted for conciseness.

Referring to FIG. 27, a storage system 20e may include a host device 600, a first accelerator 710c, a second accelerator 720b, a storage device 800e, and buses 610, 622, 631 and 632. The first accelerator 710c may include a first buffer memory BUF_1, and the second accelerator 720b may include a second buffer memory BUF_2. The storage device 800e may include a storage controller 810, first, second and third namespaces 821, 822 and 823, first and third ports PT_1e and PT_3, and first, second and third physical functions PF_1, PF_2 and PF_3.

Referring to FIG. 28, a storage system 20f may include a host device 600, a first accelerator 710a, a second accelerator 720d, a storage device 800f, and buses 610, 621, 631 and 632. The first accelerator 710a may include a first buffer memory BUF_1, and the second accelerator 720d may include a second buffer memory BUF_2. The storage device 800f may include a storage controller 810, first, second and third namespaces 821, 822 and 823, first and second ports PT_1f and PT_2, and first, second and third physical functions PF_1, PF_2 and PF_3.

The storage systems 20*a*, 20*b*, 20*c*, 20*d*, 20*e* and 20*f* of FIGS. 18, 20, 22, 25, 27 and 28 may be substantially the same as the storage systems 10*a*, 10*b*, 10*c*, 10*d*, 10*e* and 10*f* of FIGS. 5, 7, 9, 12, 14 and 15, respectively, except that the direct storage function is implemented using the first and second buffer memories BUF_1 and BUF_2 included in the first accelerators 710*a* and 710*c* and the second accelerators 720*b* and 720*d*, rather than using the buffer memory included in the storage device.

In the examples described with reference to FIGS. 16 through 28, the direct storage function may be implemented by directly allocating or assigning the PCIe DMA of the accelerator to the buffer memory inside the accelerator.

Figure 29:
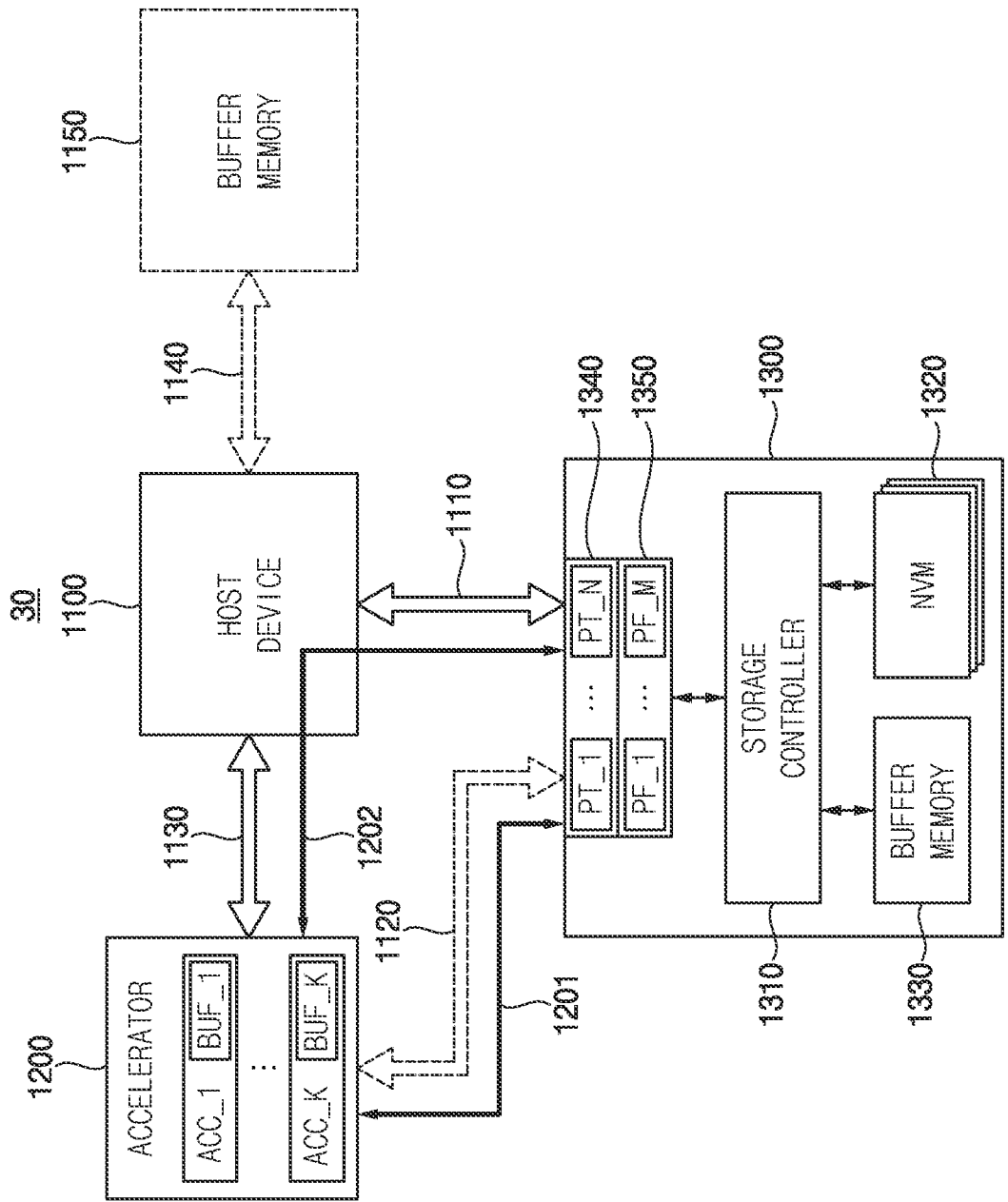
FIG. 29 is a block diagram illustrating a storage device and a storage system including the storage device according to some example embodiments.

FIG. 29 is a block diagram illustrating a storage device and a storage system including the storage device according to some example embodiments.

Referring to FIG. 29, a storage system 30 includes a host device 1100, one or more accelerators 1200, and a storage device 1300. The storage system 30 may further include buses 1110, 1120, 1130 and 1140, and a buffer memory 1150. The one or more accelerators 1200 may include first to K-th accelerators ACC_1 to ACC_K, and each of the first to K-th accelerators ACC_1 to ACC_K may include a respective one of buffer memories BUF_1, . . . , BUF_K. The storage device 1300 includes a storage controller 1310, a plurality of nonvolatile memories 1320, a buffer memory 1330, one or more ports 1340, and one or more physical functions 1350. FIG. 29 illustrates an example where the storage system 10 of FIG. 1 and the storage system 20 of FIG. 16 are combined. A direct storage function may be implemented using one of the buffer memory 1330 included in the storage device 1300 and the buffer memory included in each accelerator. In some example embodiments, the above-described direct storage function may be implemented through a first path 1201 including the bus 1120 or a second path 1202 including the buses 1110 and 1130 and the host device 1100.

Figure 30:
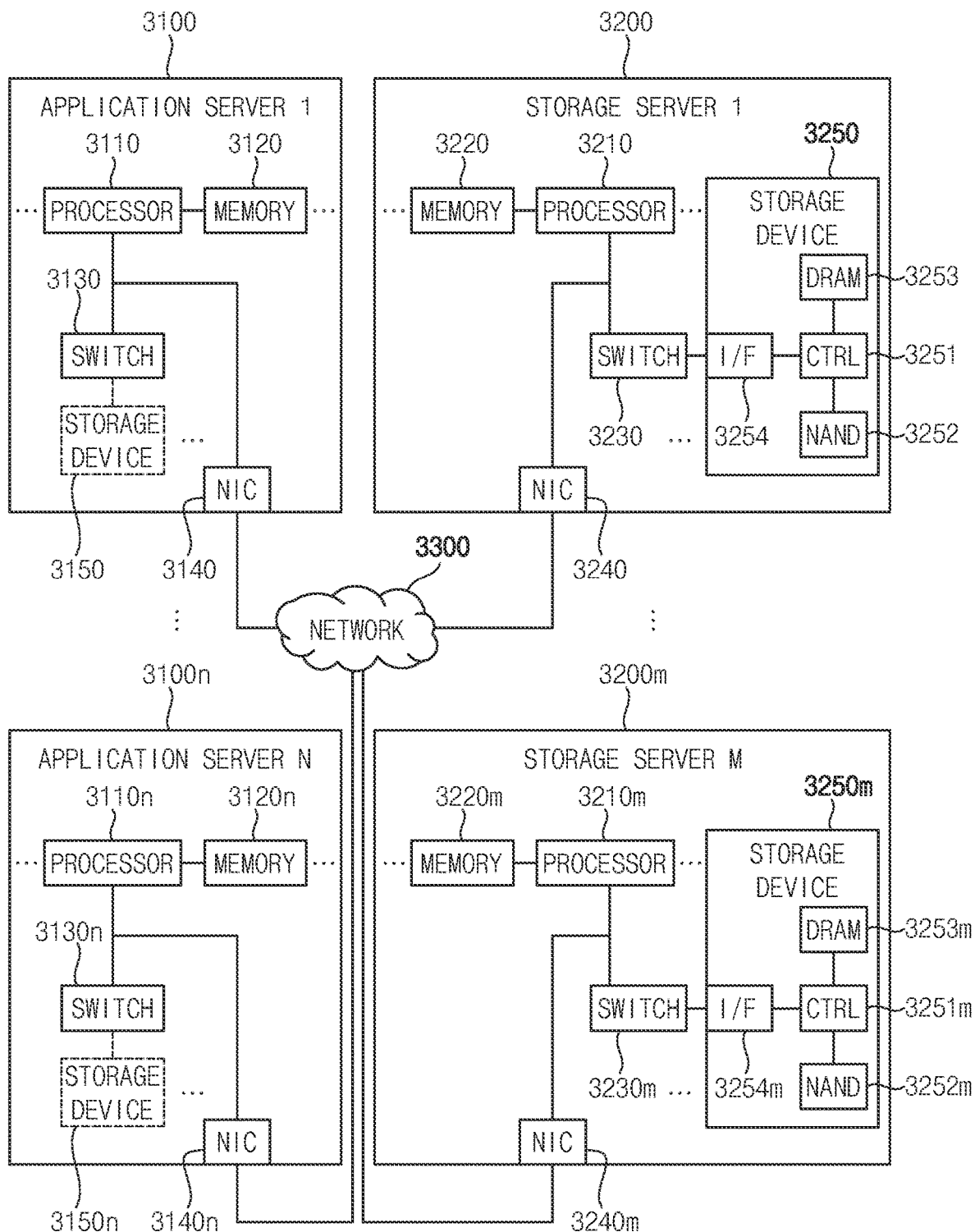
FIG. 30 is a block diagram illustrating a data center including a storage device according to some example embodiments.

FIG. 30 is a block diagram illustrating a data center including a storage device according to some example embodiments.

Referring to FIG. 30, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100*n* and storage servers 3200 to 3200*m*. The number of the application servers 3100 to 3100*n* and the number of the storage servers 3200 to 3200*m* may be variously selected according to some example embodiments, and the number of the application servers 3100 to 3100*n* and the number of the storage servers 3200 to 3200*m* may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to some example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to some example embodiments.

The application servers 3100 to 3100*n* and the storage servers 3200 to 3200*m* may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200*m* may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general network such as the TCP/IP network. For example, the network 3300 may be implemented according to at least one of protocols such as an FC over Ethernet (FCOE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100*n*, and the description of the storage server 3200 may be applied to the other storage server 3200*m*.

The application server 3100 may store data requested to be stored by a user or a client into one of the storage servers 3200 to 3200*m* through the network 3300. In addition, the application server 3100 may obtain data requested to be read by the user or the client from one of the storage servers 3200 to 3200*m* through the network 3300. For example, the application server 3100 may be implemented as a web server or a database management system (DBMS).

The application server 3100 may access a memory 3120*n* or a storage device 3150*n* included in the other application server 3100*n* through the network 3300, and/or may access the memories 3220 to 3220*m* or the storage devices 3250 to 3250*m* included in the storage servers 3200 to 3200*m* through the network 3300. Thus, the application server 3100 may perform various operations on data stored in the application servers 3100 to 3100*n* and/or the storage servers 3200 to 3200*m*. For example, the application server 3100 may execute a command for moving or copying data between the application servers 3100 to 3100*n* and/or the storage servers 3200 to 3200*m*. The data may be transferred from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. For example, the data transferred through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200*m* and/or the application servers 3100 to 3100*n*, the processor may transmit a command to the storage devices 3150 to 3150*n* and 3250 to 3250*m* or the memories 3120 to 3120*n* and 3220 to 3220*m* to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150*m* and 3250 to 3250*m* may transmit a control signal and command/address signals to NAND flash memory devices 3252 to 3252*m* in response to a read command received from the processor. When data is read from the NAND flash memory devices 3252 to 3252*m*, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210*m* in the other storage server 3200*m*, or the processors 3110 to 3110*n* in the application servers 3100 to 3100*n*. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

Each of the storage devices 3250 to 3250*m* may be one of the storage devices according to some example embodiments described with respect to FIGS. 1-29, and may support the direct storage function.

The example embodiments may be applied to various electronic devices and systems that include the storage devices and the storage systems. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IOT) device, an internet of everything (IoE) device, an e-book reader, a virtual reality (VR) device, an augmented reality (AR) device, a robotic device, a drone, an automotive, etc.

The foregoing description is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage device comprising:
   one or more ports electrically connected to external devices including a host device and a first accelerator directly connected to the host device;
   a plurality of physical functions including physical resources, and electrically connected to the external devices through the one or more ports to communicate with the external devices, wherein the plurality of physical functions include a first physical function electrically connected to the host device through the one or more ports to communicate with the host device and a second physical function electrically connected to the first accelerator through the one or more ports to communicate with the first accelerator;
a storage controller configured to control an operation of the storage device, and to communicate with the host device through the one or more ports and the first physical function and with the first accelerator through the one or more ports and the second physical function;
a plurality of nonvolatile memories electrically connected to the plurality of physical functions; and
a first buffer memory electrically connected to the plurality of physical functions,
wherein, when the storage device is accessed by the external devices, the first buffer memory is used by the one or more ports and the plurality of physical functions to temporarily store data for the external devices.

2. The storage device of claim 1, wherein, when the storage device is accessed by the external devices, the external devices exchange data with the storage device using the one or more ports, the plurality of physical functions and the first buffer memory that are included in the storage device, without using a second buffer memory that is located outside the storage device.

3. The storage device of claim 1,
wherein the one or more ports include:
a first port electrically connected to the host device; and
a second port electrically connected to the first accelerator.

4. The storage device of claim 3,
wherein the first accelerator directly communicates with the storage device through the second port, and
wherein, when the storage device is accessed by the first accelerator, the first accelerator directly exchanges data with the storage device through the second port using the first buffer memory and the second physical function.

5. The storage device of claim 3,
wherein a first portion of the plurality of nonvolatile memories is set as a first namespace corresponding to the first port and the first physical function, and
wherein a second portion of the plurality of nonvolatile memories is set as a second namespace corresponding to the second port and the second physical function.

6. The storage device of claim 3,
wherein the external devices further includes a second accelerator directly connected to the host device,
wherein the one or more ports further include a third port electrically connected to the second accelerator, and
wherein the plurality of physical functions further include a third physical function electrically connected to the third port to communicate with the second accelerator.

7. The storage device of claim 1,
wherein the external devices communicate with the storage device through the one or more ports based on CXL protocol.

8. The storage device of claim 7,
wherein the first accelerator and the storage device are electrically connected through the first port and the host device, and
wherein, when the storage device is accessed by the first accelerator, the first accelerator exchanges data with the storage device through the first port using the first buffer memory, the second physical function, and the host device.

9. The storage device of claim 7, wherein a first performance by the first physical function and a second performance by the second physical function are dynamically controlled based on a control of at least one of the host device or the first accelerator.

10. The storage device of claim 7,
wherein the external devices further include a second accelerator electrically connected to the host device, and
wherein the plurality of physical functions further include a third physical function electrically connected to the first port to communicate with the second accelerator.

11. A storage system comprising:
a host device;
a first accelerator directly connected to the host device, and including a first buffer memory; and
a storage device connected to the host device,
wherein the storage device includes:
one or more ports electrically connected to at least one of the host device or the first accelerator;
a plurality of physical functions including physical resources, and electrically connected to the host device and the first accelerator through the one or more ports to communicate with the host device and the first accelerator, wherein the plurality of physical functions include a first physical function electrically connected to the host device through the one or more ports to communicate with the host device and a second physical function electrically connected to the first accelerator through the one or more ports to communicate with the first accelerator;
a storage controller configured to control an operation of the storage device, and to communicate with the host device through the one or more ports and the first physical function and with the first accelerator through the one or more ports and the second physical function;
a plurality of nonvolatile memories electrically connected to the plurality of physical functions, and configured to store data, and
wherein, when the storage device is accessed by the first accelerator, the first buffer memory is used by the one or more ports and the plurality of physical functions to temporarily store data for the storage system.

12. The storage system of claim 11, wherein, when the storage device is accessed by the first accelerator, the first accelerator exchanges data with the storage device using the one or more ports and the plurality of physical functions that are included in the storage device and using the first buffer memory that is included in the first accelerator, without using a second buffer memory that is located outside the first accelerator and the storage device.

13. The storage system of claim 11,
wherein the one or more ports include:
a first port electrically connected to the host device; and
a second port electrically connected to the first accelerator.

14. The storage system of claim 13,
wherein the first accelerator directly communicates with the storage device through the second port, and
wherein, when the storage device is accessed by the first accelerator, the first accelerator directly exchanges data with the storage device through the second port using the first buffer memory and the second physical function.

15. The storage system of claim 13, further comprising:
a second accelerator directly connected to the host device,
wherein the one or more ports further include a third port electrically connected to the second accelerator, and wherein the plurality of physical functions further include a third physical function electrically connected to through the third port to communicate with the second accelerator.

16. The storage system of claim 11, wherein the at least one of the host device and the first accelerator communicates with the storage device through the one or more ports based on CXL protocol.

17. The storage system of claim 16, wherein the first accelerator and the storage device are electrically connected through the first port and the host device, and wherein, when the storage device is accessed by the first accelerator, the first accelerator exchanges data with the storage device through the first port using the first buffer memory, the second physical function, and the host device.

18. The storage system of claim 16, wherein a first performance by the first physical function and a second performance by the second physical function are dynamically controlled based on a control of at least one of the host device or the first accelerator.

19. The storage system of claim 16, further comprising: a second accelerator directly connected to the host device, wherein the plurality of physical functions further include a third physical function electrically connected to the first port to communicate with the second accelerator.

20. A storage system comprising:
a host device;
a first accelerator directly connected to the host device, and including a first buffer memory configured to temporarily store data;
a storage device connected to the host device; and
a second buffer memory connected to the host device, and configured to temporarily store data,
wherein the storage device includes:
one or more ports electrically connected to at least one of the host device or the first accelerator;
a first physical function and a second physical function, each including physical resources, the first physical function and the second physical function electrically connected respectively to the host device and the first accelerator through the one or more ports to communicate respectively with the host device and the first accelerator, respectively;
a storage controller configured to control an operation of the storage device, and to communicate with the host device through the one or more ports and the first physical function and with the first accelerator through the one or more ports and the second physical function;
a plurality of nonvolatile memories electrically connected to the first physical function and the second physical function; and
a third buffer memory electrically connected to the first physical function and the second physical function, and configured to temporarily store data,
wherein, when the one or more ports include a first port electrically connected to the host device and a second port electrically connected to the first accelerator, the first physical function is electrically connected to the first port, the second physical function is electrically connected to the second port, and the first accelerator is directly connected to the second port of the storage device,
wherein, when the one or more ports include only the first port electrically connected to the host device, the first physical function and the second physical function are electrically connected to the first port, and the first accelerator is electrically connected to the storage device through the first port and the host device, and
wherein, when the storage device is accessed by the first accelerator, the first accelerator exchanges data with the storage device using one of the first buffer memory and the third buffer memory and through the second physical function and the one or more ports, without using the second buffer memory.

* * * * *